US010960891B2

(12) United States Patent
Kindo et al.

(10) Patent No.: US 10,960,891 B2
(45) Date of Patent: *Mar. 30, 2021

(54) METHOD, APPARATUS AND PROGRAM OF PREDICTING OBSTACLE COURSE

(71) Applicant: TOYOTA JIDOSHA KABUSHIKI KAISHA, Toyota (JP)

(72) Inventors: Toshiki Kindo, Yokohama (JP); Kazuaki Aso, Susono (JP); Masahiro Harada, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 373 days.

This patent is subject to a terminal disclaimer.

(21) Appl. No.: 16/050,716

(22) Filed: Jul. 31, 2018

(65) Prior Publication Data

US 2018/0334172 A1 Nov. 22, 2018

Related U.S. Application Data

(63) Continuation of application No. 12/312,195, filed as application No. PCT/JP2007/071923 on Nov. 12, 2007, now Pat. No. 10,065,650.

(30) Foreign Application Priority Data

Nov. 10, 2006 (JP) .................................. 2006-305744

(51) Int. Cl.
*B60W 40/072* (2012.01)
*G08G 1/16* (2006.01)
(Continued)

(52) U.S. Cl.
CPC ........ *B60W 40/072* (2013.01); *B60W 40/076* (2013.01); *G05D 1/0214* (2013.01);
(Continued)

(58) Field of Classification Search
CPC ............. B60W 40/072; B60W 40/076; B60W 30/0956; G08G 1/165; G08G 1/166;
(Continued)

(56) References Cited

U.S. PATENT DOCUMENTS 5,111,401 A 5/1992 Everett, Jr. et al.
6,859,731 B2 2/2005 Takafuji et al.
(Continued)

FOREIGN PATENT DOCUMENTS

JP 2799375 B2 9/1998
JP 2001-093098 A 4/2001
(Continued)

OTHER PUBLICATIONS

Jul. 14, 2016 Office Action Issued in U.S. Appl. No. 12/312,195.
(Continued)

*Primary Examiner* — Russell Frejd
(74) *Attorney, Agent, or Firm* — Oliff PLC

(57) ABSTRACT

A method, an apparatus, and a program of predicting an obstacle course, capable of appropriately predicting a course of an obstacle even under a complicated traffic environment, are provided. The course, which the obstacle may take, is predicted based on the position and the internal state of the obstacle, and at the time of the prediction, a plurality of courses are probabilistically predicted for at least one obstacle. When there are a plurality of obstacles, the course in which different obstacles interfere with each other is obtained from the predicted courses, which a plurality of obstacles may take, and the predictive probability of the course for which the probabilistic prediction is performed from the courses in which they interfere with each other is lowered. Probability of realizing each of a plurality of courses including the course of which predicted probability is lowered is calculated.

17 Claims, 22 Drawing Sheets

(51) Int. Cl.
  *B60W 40/076* (2012.01)
  *G05D 1/02* (2020.01)
  *B60W 30/095* (2012.01)

(52) U.S. Cl.
  CPC ............ *G08G 1/165* (2013.01); *G08G 1/166* (2013.01); *B60W 30/0956* (2013.01); *G05D 1/024* (2013.01); *G05D 1/027* (2013.01); *G05D 1/0246* (2013.01); *G05D 1/0257* (2013.01); *G05D 1/0278* (2013.01); *G05D 2201/0213* (2013.01)

(58) Field of Classification Search
  CPC .... G05D 1/0214; G05D 1/024; G05D 1/0246; G05D 1/0257; G05D 1/027; G05D 1/0278; G05D 2201/0213
  See application file for complete search history.

(56) References Cited

U.S. PATENT DOCUMENTS

| | | |
|---|---|---|
| 2004/0024527 A1 | 2/2004 | Patera |
| 2005/0134440 A1 | 6/2005 | Breed |
| 2005/0165550 A1* | 7/2005 | Okada ................... G08G 1/166 701/301 |
| 2005/0216181 A1 | 9/2005 | Estkowski et al. |
| 2006/0041381 A1 | 2/2006 | Simon et al. |
| 2006/0058964 A1 | 3/2006 | Lucas et al. |
| 2007/0030131 A1 | 2/2007 | Takahama et al. |
| 2009/0143987 A1 | 6/2009 | Bect et al. |

FOREIGN PATENT DOCUMENTS

| | | |
|---|---|---|
| JP | 2001-148098 A | 5/2001 |
| JP | 2003-081037 A | 3/2003 |
| JP | 2003-205804 A | 7/2003 |
| JP | 2006-085285 A | 3/2006 |
| JP | 2006-248361 A | 9/2006 |

OTHER PUBLICATIONS

Feb. 22, 2017 Office Action Issued in U.S. Appl. No. 12/312,195.
Sep. 21, 2017 Office Action Issued in U.S. Appl. No. 12/312,195.
Feb. 1, 2018 Office Action issued in U.S. Appl. No. 12/312,195.
Broadhurst et al.; "Monte Carlo Road Safety Reasoning;" IEEE Intelligent Vehicle Symposium (IV 2005); Jun. 2005; pp. 319-324.
Jun. 17, 2011 Office Action cited in U.S. Appl. No. 12/312,195.
Nov. 28, 2011 Office Action issued in U.S. Appl. No. 12/312,195.
Aug. 26, 2014 Office Action U.S. Appl. No. 12/312,195.
Apr. 30, 2015 Office Action issued in U.S. Appl. No. 12/312,195.
Aug. 1, 2018 Notice of Allowance issued in U.S. Appl. No. 12/312,195.

* cited by examiner

METHOD, APPARATUS AND PROGRAM OF PREDICTING OBSTACLE COURSE

This is a Continuation of application Ser. No. 12/312,195 filed Apr. 29, 2009, issued as U.S. Pat. No. 10,065,650, which claims priority to PCT/JP2007/071923 filed Nov. 12, 2007, which claims priority to JP 2006-305744, filed Nov. 10, 2006. The disclosure of the prior applications is hereby incorporated by reference herein in its entirety.

TECHNICAL FIELD

The present invention relates to a method, an apparatus, and a program of predicting an obstacle course, for predicting a course, which an obstacle present within a predetermined area may take.

BACKGROUND ART

Conventionally, as a technique to improve safety of a vehicle such as a four-wheeled vehicle, a technique to avoid collision by determining risk that the vehicle collides with the obstacle with high accuracy is known. For example, the following patent document 1 discloses the technique relating to a collision avoidance apparatus provided with a yaw rate sensor for detecting yaw rate of a subject vehicle, a velocity detection device for detecting a velocity of the subject vehicle, and a radar device for detecting a position and a velocity of a surrounding obstacle.

In the conventional technique, a predicted travel trajectory of the subject vehicle is obtained by the yaw rate sensor and the velocity sensor and a predetermined area on both sides of the predicted travel trajectory is obtained as a predicted travel area of the subject vehicle, and on the other hand, a predicted travel trajectory and a predicted travel area of the obstacle are obtained based on a position and a velocity of the obstacle detected by the radar device. After that, a collision point or an adjacent point of the both is calculated from each predicted travel area of the subject vehicle and the obstacle. Also, collision risk is determined by calculating target deceleration and acceleration and target deceleration, and when the risk of collision arises as a result of the determination, a velocity control of the subject vehicle is performed according to the target deceleration and acceleration and the target deceleration.

Patent Document 1: Japanese Patent No. 2799375

DISCLOSURE OF THE INVENTION

Problem to be Solved by the Invention

However since only the course of one obstacle is predicted for the subject vehicle in the above-described conventional technique, this could not be applied to a complicated traffic environment where a plurality of obstacles is present around the subject vehicle.

The present invention is achieved in view of the above-described circumstances, and an object of the present invention is to provide the method, the apparatus, and the program of predicting the obstacle course for appropriately predicting the course of the obstacle even under the complicated traffic environment.

Means for Solving Problem

To solve the problems as described above, an obstacle course prediction method according to the present invention, which a computer predicts a course of the obstacle, the computer providing a memory unit that memorizes at least a position and an internal state of an obstacle present within a predetermined area from a mobile object, the method includes performing prediction of a course, which the obstacle may take, based on the position and the internal state of the obstacle read from the memory unit, and performing probabilistic prediction of a plurality of courses, which the obstacle may take, for at least one of the obstacles at the time of the prediction; obtaining a course in which the obstacles interfere with each other within the courses, which a plurality of the obstacles predicted at the course predicting may take, and lowering predicted probability of the course for which the probabilistic prediction is performed within the interfering courses, when there are a plurality of the obstacles; and calculating probability of realizing each of the plurality of courses including the course in which the predicted probability is lowered at the course interference assessing.

In the present invention, the obstacle course prediction method according to the present invention further includes selecting one of the obstacles satisfying a predetermined condition as a specific obstacle, wherein the course predicting includes performing probabilistic prediction of a plurality of courses, which the specific obstacle may take, and performing prediction of the course, which the obstacle other than the specific obstacle may take, the course interference assessing lowers predicted probability of a course of which distance at the same time from a course, which the general obstacle may take, is smaller than a predetermined value, within a plurality of courses, which the specific obstacle may take, when there are a plurality of the obstacles, and the probability calculating calculates probability of realizing each of a plurality of courses of the specific obstacle including the course the predicted probability of which is lowered at the course interference assessing.

In the present invention, in the obstacle course prediction method according to the present invention, the specific obstacle course predicting includes generating variation in position, which the specific obstacle may take with time, as a trajectory in space-time composed of time and space, based on the position and the internal state of the obstacle, and performing probabilistic prediction calculation of a course, which the specific obstacle may take, using the trajectory generated at the trajectory generating.

In the present invention, in the obstacle course prediction method according to the present invention, the general obstacle course predicting predicts the course of the general obstacle assuming that the internal state of the general obstacle is maintained.

In the present invention, the obstacle course prediction method according to the present invention further includes generating a course of the mobile object based on a position and an internal state of the mobile object; calculating collision probability between the course of the mobile object generated at the course generating and each of a plurality of courses, which the specific obstacle may take, of which probability is calculated for each course at the probability calculating.

In the present invention, in the obstacle course prediction method according to the present invention, the course predicting performs probabilistic prediction of a plurality of courses, which the obstacle may take, the course interference assessing lowers probability of taking the course of which distance at the same time from the course of another of the obstacles is smaller than a predetermined value within the courses, which a plurality of the obstacles may take, when there are a plurality of the obstacles, and the probability calculating calculates the probability of realizing each of all the courses of a plurality of the obstacles including the course the predicted probability of which is lowered at the course interference assessing.

In the present invention, in the obstacle course prediction method according to the present invention, the course predicting includes generating variation in position, which the obstacle may take with time, as a trajectory in a space-time composed of time and space, based on the position and the internal state of the obstacle, and performing probabilistic prediction calculation of the course of the obstacle by using the trajectory generated at the trajectory generating.

In the present invention, the obstacle course prediction method according to the present invention further includes generating a course of the mobile object based on the position and the internal state of the mobile object; and calculating collision probability between the course of the mobile object generated at the course generating and each of all courses, which the obstacle may take, probability of which is calculate for each course at the probability calculating.

An obstacle course prediction apparatus for predicting a course of an obstacle exiting around a mobile object according to the present invention, includes a memory unit that memorizes at least a position and an internal state of the obstacle present within a predetermined area from the mobile object; a course predicting unit that performs prediction of a course, which the obstacle may take, based on the position and the internal state of the obstacle read from the memory unit, and performs probabilistic prediction of a plurality of courses, which the obstacle may take, for at least one of the obstacles at the time of the prediction; a course interference assessing unit that obtains a course in which the obstacles interfere with each other within the courses, which a plurality of the obstacles predicted at the course predicting unit may take, and lowers predicted probability of the course for which the probabilistic prediction is performed within the interfering courses, when there are a plurality of the obstacles; and a probability calculating unit that calculates probability of realizing each of the plurality of courses including the course in which the predicted probability is lowered at the course interference assessing unit.

In the present invention, the obstacle course prediction apparatus according to the present invention further includes a specific obstacle selecting unit that selects one of the obstacles satisfying a predetermined condition as a specific obstacle, wherein the course predicting unit has a specific obstacle course predicting unit that performs probabilistic prediction of a plurality of courses, which the specific obstacle may take, and a general obstacle course predicting unit that performs prediction of the course, which the obstacle other than the specific obstacle may take, the course interference assessing unit lowers predicted probability of a course of which distance at the same time from a course, which the general obstacle may take, is smaller than a determined value, within a plurality of courses, which the specific obstacle may take, when there are a plurality of the obstacles, and the probability calculating unit calculates probability of realizing each of a plurality of courses of the specific obstacle including the course the predicted probability of which is lowered at the course interference assessing unit.

In the present invention, in the obstacle course prediction apparatus according to the present invention, the specific obstacle course predicting unit includes a trajectory generating unit that generates variation in position, which the specific obstacle may take with time, as a trajectory in space-time composed of time and space, based on the position and the internal state of the obstacle, and a prediction calculating unit that performs probabilistic prediction calculation of a course, which the specific obstacle may take, using the trajectory generated at the trajectory generating unit.

In the present invention, in the obstacle course prediction apparatus according to the present invention, the general obstacle course predicting unit predicts the course of the general obstacle assuming that the internal state of the general obstacle is maintained.

In the present invention, the obstacle course prediction apparatus according to the present invention further includes a course generating unit that generates a course of the mobile object based on a position and an internal state of the mobile object; and a collision probability calculating unit that calculates collision probability between the course of the mobile object generated at the course generating unit and each of a plurality of courses, which the specific obstacle may take, of which probability is calculated for each course at the probability calculating unit.

In the present invention, in the obstacle course prediction apparatus according to the present invention, the course predicting unit performs probabilistic prediction of a plurality of courses, which the obstacle may take, the course interference assessing unit lowers probability of taking the course of which distance at the same time from the course of another of the obstacles is smaller than a predetermined value within the courses, which a plurality of the obstacles may take, when there are a plurality of the obstacles, and the probability calculating unit calculates the probability of realizing each of all the courses of a plurality of the obstacles including the course the predicted probability of which is lowered at the course interference assessing unit.

In the present invention, in the obstacle course prediction apparatus according to the present invention, the course prediction unit includes a trajectory generating unit that generates variation in position, which the obstacle may take with time, as a trajectory in a space-time composed of time and space, based on the position and the internal state of the obstacle, and a prediction calculating unit that performs probabilistic prediction calculation of the course of the obstacle by using the trajectory generated at the trajectory generating unit.

In the present invention, the obstacle course prediction apparatus according to the present invention further includes a course generating unit that generates a course of the mobile object based on the position and the internal state of the mobile object; and a collision probability calculating unit that calculates collision probability between the course of the mobile object generated at the course generating unit and each of all courses, which the obstacle may take, probability of which is calculate for each course at the probability calculating unit.

An obstacle course prediction program according to the present invention allows the computer to execute the obstacle course prediction method.

Effect of the Invention

According to the present invention, even about the course, which may be taken with high probability when seen on a separate obstacle basis, if this interferes with another obstacle, the prediction may be performed by taking an effect thereof into consideration, by predicting the course, which the obstacle may take, based on the position and the internal state of the obstacle, and at the time of the prediction, probabilistically predicting a plurality of courses of at least one obstacle, and when there are a plurality of obstacles, obtaining the course in which different obstacles interfere with each other out of the predicted courses, which a plurality of obstacles may take, and lowering the predictive probability of the course for which the probabilistic prediction is performed out of the courses in which they interfere with each other, and calculating probability that each of a plurality of courses including the course of which predicted probability is lowered, is realized. Therefore, it becomes possible to appropriately predict the course of the obstacle even under the complicated traffic environment.

Figure 1:
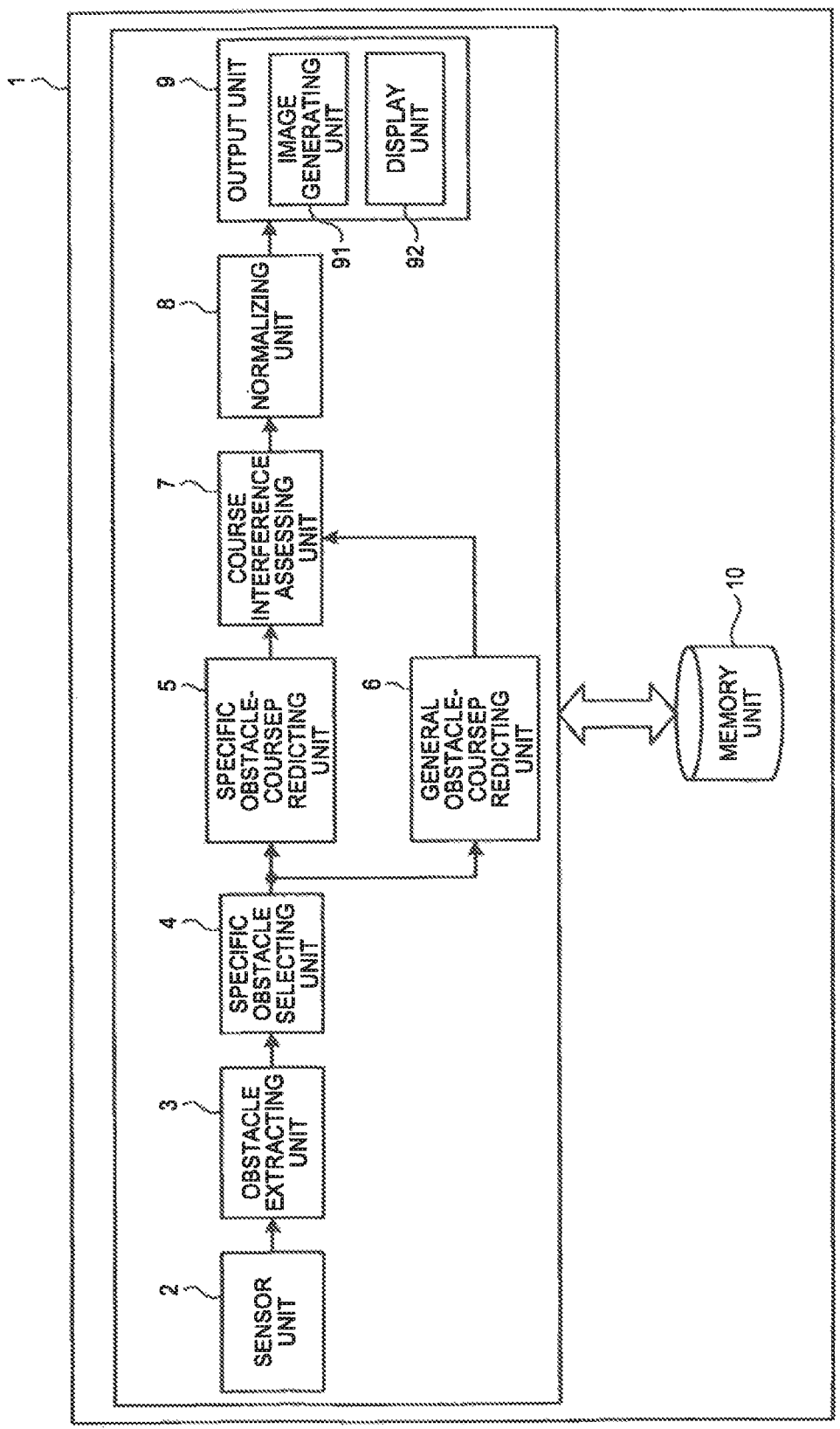
FIG. 1 is a block diagram showing a functional configuration of an obstacle course prediction apparatus according to a first embodiment of the present invention.

EXPLANATIONS OF LETTERS OR NUMERALS 1, 11, 21, 31, 41 obstacle course prediction apparatus
2, 32 Sensor unit
3 Obstacle extracting unit
4 Specific obstacle selecting unit
5, 12 Specific obstacle-course predicting unit
6 General obstacle-course predicting unit
7 Course interference assessing unit
8 Normalizing unit
9 Output unit
10 Memory unit
13, 23 Trajectory generating unit
14, 24 Prediction calculating unit
22 Obstacle course predicting unit
33 Subject vehicle-course generating unit
34 Collision probability calculating unit
35 Output unit
91, 351 Image generating unit
92, 352 Display unit
131, 231 Operation selecting unit
132, 232 Object operating unit
133, 233 Determining unit
353 Warning sound emitting unit

BEST MODE(S) FOR CARRYING OUT THE INVENTION

Hereinafter, a best mode for implementing the present invention (hereinafter, referred to as an "embodiment") is described with reference to attached drawings.

First Embodiment

FIG. 1 is a block diagram showing a functional configuration of an obstacle course prediction apparatus according to a first embodiment of the present invention. An obstacle course prediction apparatus 1 shown in the drawing installed in a vehicle such as a four-wheeled vehicle, which is a mobile object, for predicting a course, which an obstacle present around a subject vehicle may take.

The obstacle course prediction apparatus 1 is provided with a sensor unit 2 for detecting a position and an internal state of an object present within a predetermined area, an obstacle extracting unit 3 for extracting the obstacle included in the predetermined area based on a result detected by the sensor unit 2, a specific obstacle selecting unit 4 for selecting one obstacle (specific obstacle) satisfying a predetermine condition from the obstacles extracted by the obstacle extracting unit 3, a specific obstacle-course predicting unit 5 for probabilistically predicting a course of the specific obstacle selected by the obstacle selecting unit 4, a general obstacle-course predicting unit 6 for predicting a course of a general obstacle other than the specific obstacle, a course interference assessing unit 7 for assessing an interference between a predicted course of the specific obstacle and a predicted course of the general obstacle, a normalizing unit 8, which is probability calculating means for calculating probability that the course, which the specific obstacle may take, is realized, using an assessment result by the course interference assessing unit 7, an output unit 9 for outputting information regarding the course of the specific obstacle calculated by the normalizing unit 8, and a memory unit 10 for memorizing information including the position and the internal state of the object detected by the sensor unit 2 and a variety of calculation results.

The sensor unit 2 is realized by using millimeter wave radar, laser radar, an image sensor, or the like. In addition, the sensor unit 2 is provided with various sensors such as a velocity sensor, a yaw rate sensor, an accelerated velocity sensor, and a rudder angle sensor. Meanwhile, the internal state of the object to be detected by the sensor unit 2 is a beneficial state, which may be used to predict the course of the object, and is preferably a physical amount such as a velocity (having a velocity and a direction) and a yaw rate (having a volume and a direction) of the object, and also includes a case in which values of the physical amounts are 0 (a state in which the object is stopped).

The output unit 9 has an image generating unit 91 for generating an image based on information corresponding to a result of the process performed by the course interference assessing unit 7, and a display unit 92, which is realized by using a liquid crystal display, a plasma display, or an organic electroluminescence (EL) display, for displaying and outputting information including the image generated by the image generating unit 91. Also, as the display unit 92, a projector is located on an upper posterior portion of a driver seat to make a superimposed display on a front glass of the vehicle.

The memory unit 10 memorizes predicted results by the specific obstacle-course predicting unit 5 and the general obstacle-course predicting unit 6, and a result of the interference assessment by the course interference assessing unit 7, in addition to the detected result by the sensor unit 2. The memory unit 10 is realized by using a ROM in which a program to activate a predetermined operation system (OS), an obstacle course prediction program according to the first embodiment, or the like are memorized in advance, and a random access memory (RAM) in which a calculation parameter, data, or the like of each process are memorized. Also, the memory unit 10 may be realized by providing an interface on which a computer-readable recording medium may be mounted on the obstacle course prediction apparatus 1 and mounting the recording medium corresponding to the interface.

The obstacle course prediction apparatus 1 having the above-described functional configuration is an electronic device (computer) provided with a central processing unit (CPU) having a calculation function and a control function. The CPU provided on the obstacle course prediction apparatus 1 executes a calculation process regarding an obstacle course prediction method according to the first embodiment, by reading the information memorized and stored in the memory unit 10 and the various programs including the above-described obstacle course prediction program from the memory 10.

Meanwhile, the obstacle course prediction program according to the first embodiment may be recorded in the computer-readable recording medium such as a hard disk, a flexible disk, a CD-ROM, a DVD-ROM, a flash memory, and a MO disk, and widely distributed.

Figure 2:
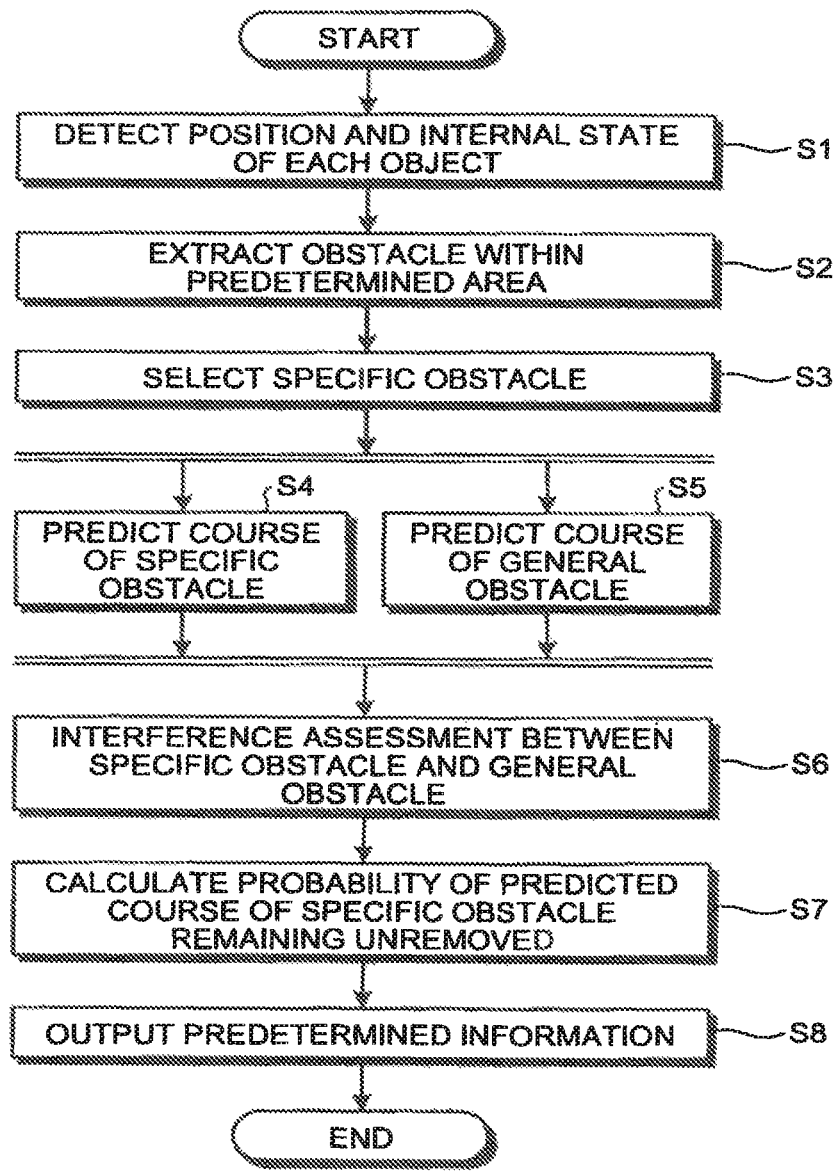
FIG. 2 is a flowchart showing an overview of a process of an obstacle course prediction method according to the first embodiment of the present invention.

Next, the obstacle course prediction method according to the first embodiment is described. FIG. 2 is a flowchart showing an overview of a process of the obstacle course prediction method according to the first embodiment. Although hereinafter it is described assuming that all the objects to be predicted travel on a two-dimensional plane, the obstacle course prediction method according to the first embodiment is applicable to the object traveling in a three-dimensional space. Also, this is applicable to a case in which one object has a plurality of degrees of freedom (an object such as a robot arm having six degrees of freedom, for example).

First, the sensor unit 2 detects the position of the object within the predetermined area with respect to the subject vehicle and the internal state thereof, and stores the detected information in the memory unit 10 (step S1). Hereinafter, the position of the object shall be represented by a value of a central portion of the object, and the internal state of the object shall be specified by the velocity (velocity v, direction θ).

Figure 3:
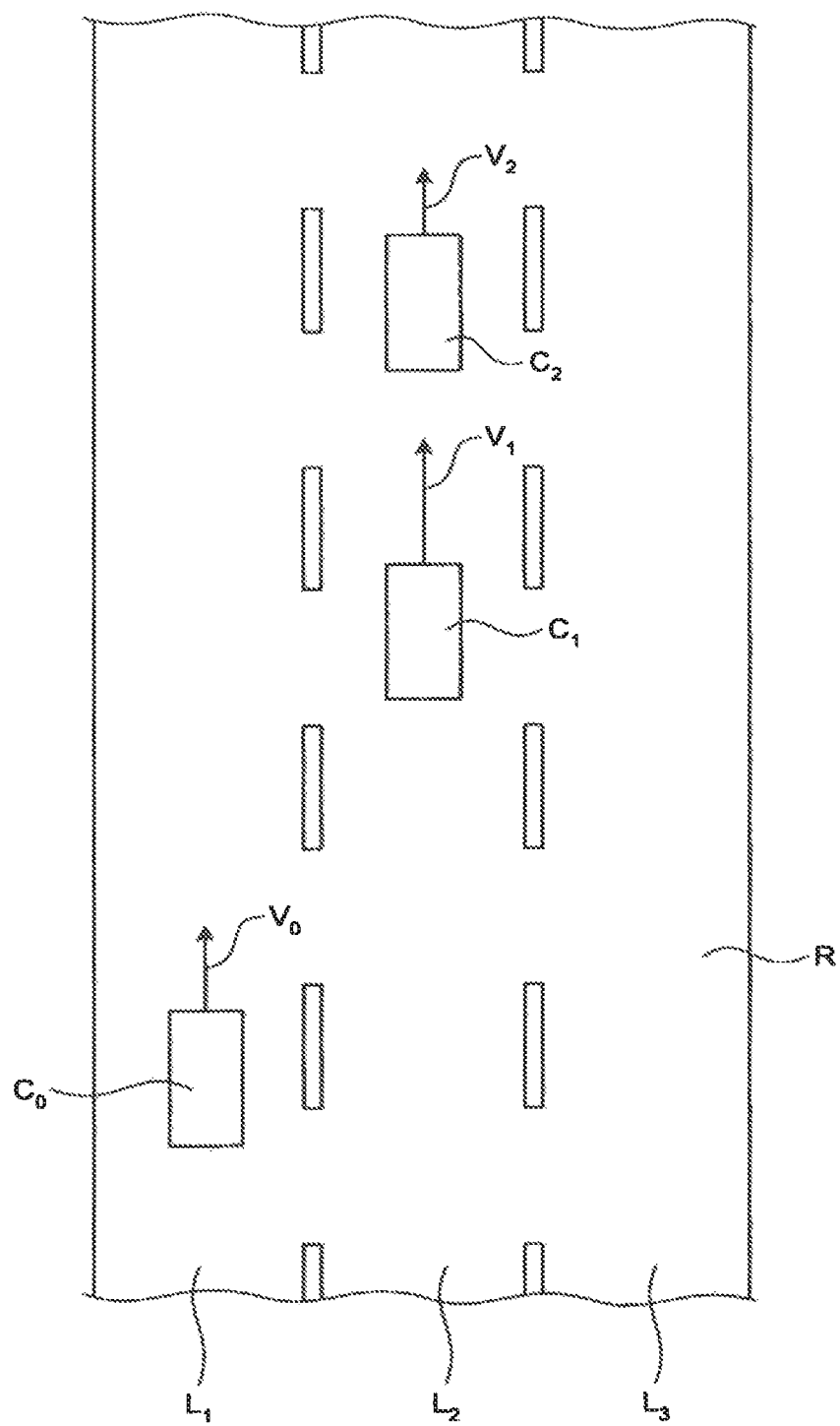
FIG. 3 is a view showing a circumstance around a subject vehicle after extracting an obstacle.

Next, the obstacle extracting unit 3 extracts the obstacle within the predetermined area based on the result detected by the sensor unit 2 (step S2). At the step S2, the object, which may be considered as the obstacle interrupting travel of the subject vehicle, is extracted from the objects detected at the step S1 and other objects are excluded. FIG. 3 is a view showing a condition around an subject vehicle $C_0$ when two vehicles $C_1$ and $C_2$ are extracted as the obstacles with respect to the subject vehicle $C_0$, which travels straight with a velocity $v_0$. This drawing shows a case in which the subject vehicle $C_0$ travels on a left lane $L_1$ of a road R having three lanes, and two preceding vehicles $C_1$ and $C_2$ travel on a center lane $L_2$ on a right side thereof. In addition, there is no object at least within an area detectable by the sensor unit 2 on a right lane $L_3$ on a rightmost side thereof. In FIG. 3, all three vehicles travel straight, and a velocity $v_1$ of a posterior vehicle $C_1$ shall be larger than a velocity $V_2$ of an anterior vehicle $C_2$.

Subsequently, if there are a plurality of obstacles extracted by the obstacle extracting unit 3, the specific obstacle selecting unit 4 selects one specific obstacle therefrom (step S3). A selection criterion when selecting the specific obstacle is set in advance, and the selection criterion may be selected from conditions of an object, which is the closest to the subject vehicle $C_0$, an object, which is the fastest, or an object, which is the slowest, around the subject vehicle $C_0$. For example, in FIG. 3, when the obstacle, which is the closest to the subject vehicle $C_0$, is made the specific obstacle, the vehicle $C_1$ is the specific obstacle.

After that, the specific obstacle-course predicting unit 5 probabilistically predicts a plurality of courses, which the specific obstacle selected at the step S3 may take (step S4). At the step S4, conventionally known various methods may be applied. For example, the course may be predicted by providing a predetermined probability distribution to a plurality of courses, which the specific obstacle may take, according to present status. Also, a model corresponding to a type of the specific obstacle may be memorized in the memory unit 10 in advance. When using the model, a corresponding model is read from the memory unit 10, and the course is probabilistically predicted by using the read model.

Figure 4:
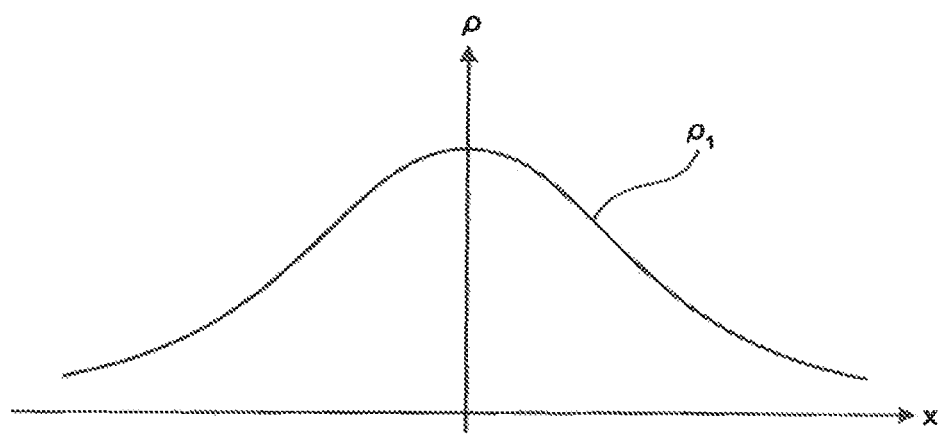
FIG. 4 is a view showing an example of a probability distribution to be provided to a course of a specific obstacle.

FIG. 4 is a view showing an example of the probability distribution to be provided to the course of the specific obstacle at the step S4. Specifically, a case in which a probability distribution curve $\rho_1$ having the largest value in a straight through direction is provided to the specific obstacle is shown. In this sense, an x coordinate in FIG. 4 is a coordinate in a width direction of the road R, and an origin thereof represents a present position of the specific obstacle. Meanwhile, the probability distribution to be provided to the specific obstacle is preferably unimodal as represented by a normal distribution; however, a distribution function thereof is not limited.

On the other hand, the general obstacle-course predicting unit 6 predicts the course of the general obstacle from the present position (step S5). At that time, the general obstacle shall move while holding the internal state detected by the sensor unit 2 and memorized in the memory unit 10, and one course is predicted for one general obstacle. The step S5 is performed in parallel with the above-described specific obstacle course prediction process at the step S4.

Subsequently, the course interference assessing unit 7 assesses the interference between a plurality of courses of the specific obstacle, which are probabilistically predicted at the step S4, and the course of the general obstacle predicted by the general obstacle-course predicting unit 6 at the step S5 (step S6). More specifically, the probability (predicted probability) that the specific obstacle takes the course to collide with the course of the general obstacle out of a plurality of courses is set to 0 and this is removed. The collision at that time is an amount defined according to the type of the obstacle, and in a case in which both of the specific obstacle and the general obstacle are vehicles, it is determined that they collide with each other when a distance therebetween becomes smaller than a predetermined distance (for example, standard width and length of the vehicle) at the same time.

Figure 5:
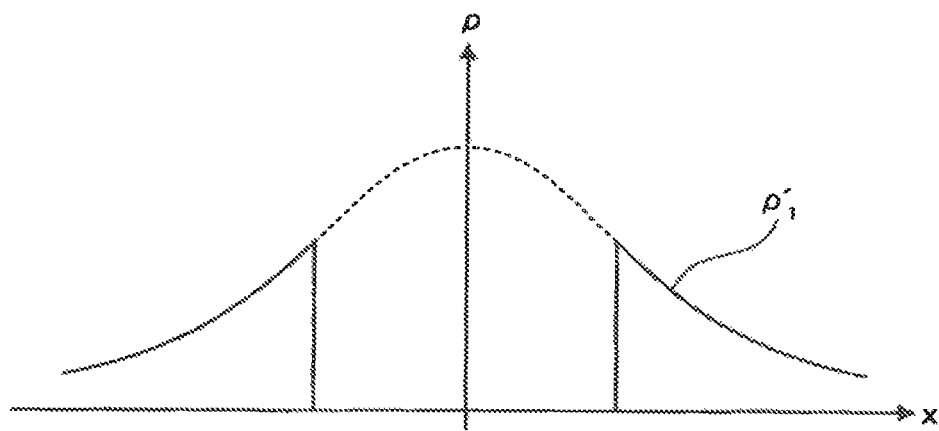
FIG. 5 is a view showing a curve obtained by removing a trajectory in which the specific obstacle collides with a general obstacle within a predetermined time period.

FIG. 5 is a view showing a curve, which may be obtained by removing a line representing that the vehicle $C_1$ collides with the vehicle $C_2$, which is the general obstacle, in a predetermined time period, in a case in which the course probability distribution of the vehicle $C_1$, which is the specific obstacle, is given as the probability distribution curve $\rho_1$ shown in FIG. 4. In the curve $\rho_1'$ shown in this drawing, a total sum of probability is not 1, so that this does not provide the probability distribution in a precise sense the way it is. Therefore, the normalizing unit 8 obtains a course predicted probability of the vehicle $C_1$, which remains unremoved by the course interference assessing unit 7 at the step S6 (step S7). That is to say, the normalizing unit 8 normalizes such that the total sum of the probability of the course of the specific obstacle, which remains unremoved at the step S6, becomes 1, and provides correctly defined probability to all the predicted courses.

Figure 6:
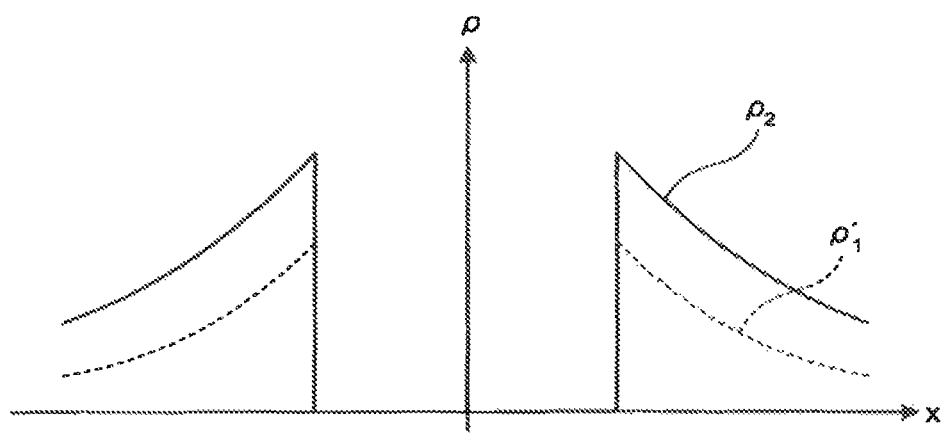
FIG. 6 is a view showing a probability distribution curve after normalizing the curve in FIG. 5.

FIG. 6 is a view showing a probability distribution curve $\rho_2$ obtained by normalizing the distribution $\rho_1'$ at the step S7. As is clear from FIG. 6, under a road environment shown in FIG. 3, due to presence of the preceding vehicle $C_2$, it is determined to be risky that the vehicle $C_1$ catches up on the same while traveling straight through, and it is determined that there is no possibility that this travels straight through. On the other hand, in the conventional technique disclosed in the above-described patent document 1, it is not possible to predict for a plurality of obstacles even under the road environment shown in FIG. 3. In the conventional technique, if only the course of the vehicle $C_1$ is predicted, it is determined that the probability of traveling straight through is the highest. However, it is obvious that this course is unrealistic due to the significantly high probability to collide with the vehicle $C_2$. As is clear from this example, according to the obstacle course prediction method according to the first embodiment, the course may be predicted under a complicated traffic environment more appropriately than in the conventional technique.

Figure 7:
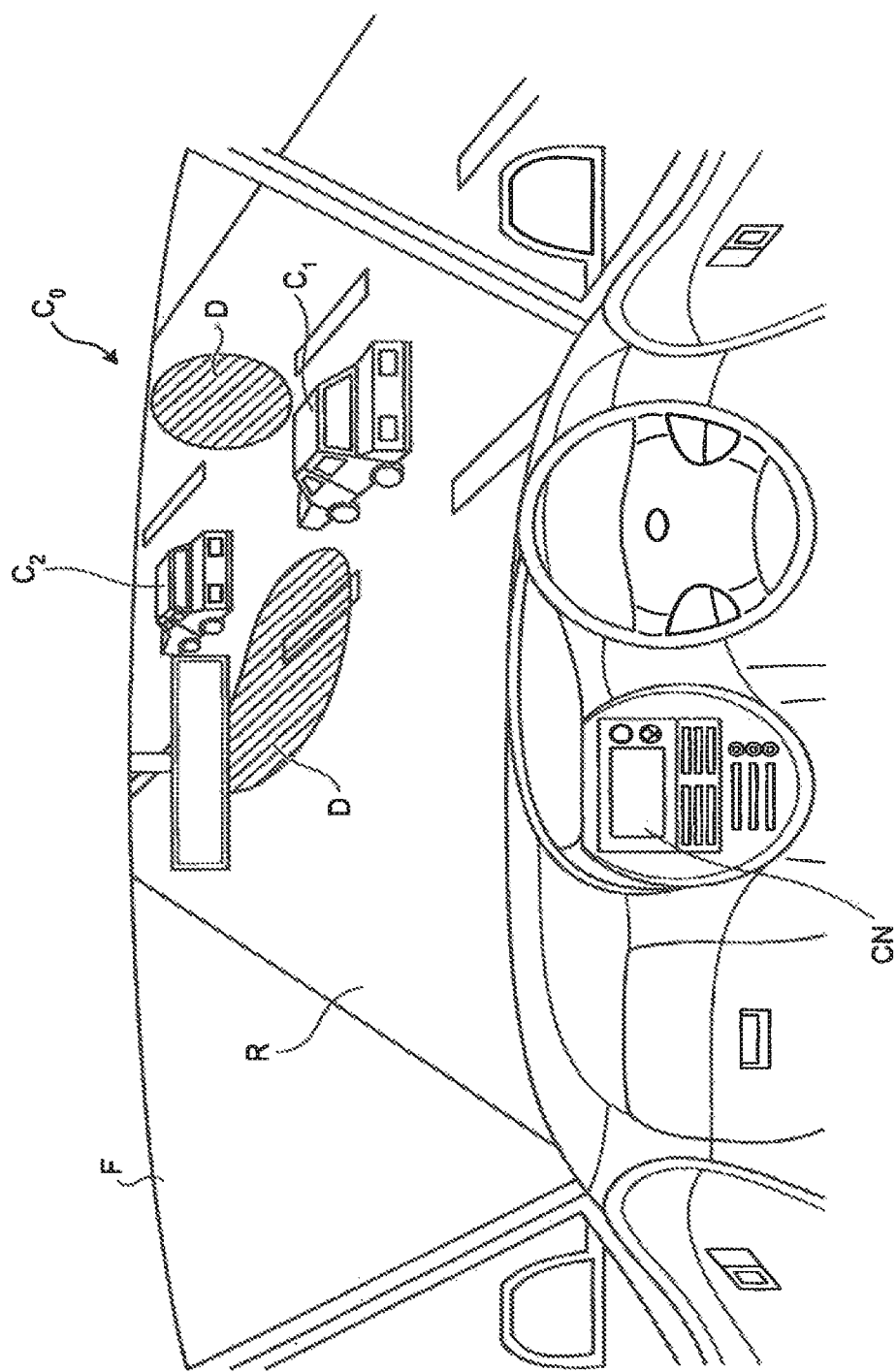
FIG. 7 is a view showing a display output example of a course predicted result of the specific obstacle in a display unit.

Next, the output unit 9 outputs predetermined information based on the predicted course probability of the specific obstacle obtained at the step S7 (step S8). For example, it is preferable to display an area in which the specific obstacle may take the course with probability larger than a predetermined value. FIG. 7 is a view showing a display output example of a predicted result in the display unit 92, and schematically showing the display output example of the course predicted result for the vehicle $C_1$ as the specific obstacle in the road environment shown in FIG. 3. FIG. 7 shows a case in which an area D indicating a course of which probability is not smaller than the predetermined value out of the predicted courses of the vehicle $C_1$ is translucently superimposingly displayed on a front glass F of the subject vehicle $C_0$.

The above-described superimposed display is realized by projecting the image generated by the image generating unit 91 on the front glass F from the projector (not shown) installed on the upper posterior portion of the driver seat of the subject vehicle $C_0$. Thereby, a driver of the subject vehicle $C_0$ may immediately recognize an area in which the risk might arise in the near future while driving. Therefore, the driver may appropriately avoid the risk by reflecting a recognition result to driving.

Meanwhile, when there is only one obstacle extracted by the obstacle extracting unit 3, this may be considered as the specific obstacle, and the output unit 9 may output the predicted result by the specific obstacle-course predicting unit 5.

The obstacle course prediction method according to the first embodiment is repeated at predetermined time intervals, and information always based on the newest road environment is output. Therefore, according to the obstacle course prediction method according to the first embodiment, it becomes possible to aid the driver of the subject vehicle to perform the appropriate operation in response to the road environment changing every second.

According to the above-described first embodiment of the present invention, even about the course, which may be taken with high probability when seen on a separate obstacle basis, if this interferes with another obstacle, the prediction may be performed by taking an effect thereof into consideration, by predicting the course, which the obstacle may take, based on the position and the internal state of the obstacle, and at the time of the prediction, probabilistically predicting a plurality of courses of the specific obstacles selected by a predetermined condition and predicting the course of the general obstacle other than those, and when there are a plurality of obstacles, lowering the predicted probability of the course of which distance at the same time from the course, which the general obstacle may take, is smaller than a predetermined value out of a plurality of courses, which the specific obstacle may take, and calculating the probability that each of a plurality of courses of the specific obstacle including the course of which predicted probability is lowered, is realized. Therefore, it becomes possible to appropriately predict the course of the obstacle even under the complicated traffic environment.

In addition, according to the first embodiment, the obstacle, which is most likely to be the obstacle for the vehicle, is selected as the specific obstacle, and the probabilistic prediction is performed for a plurality of courses of the specific obstacle, and on the other hand, the course maintaining the present status is taken as the course of other general obstacles, so that practical course prediction process of the obstacle may be realized without a heavy load on the device while controlling a calculation amount required for the process.

Further, according to the first embodiment, it is possible to present information including a degree of risk by outputting the result predicted for the specific obstacle. Therefore, the driver of the subject vehicle, who receives the information, may drive while rapidly and appropriately avoiding the risk, which might arise in the near future while driving.

Figure 8:
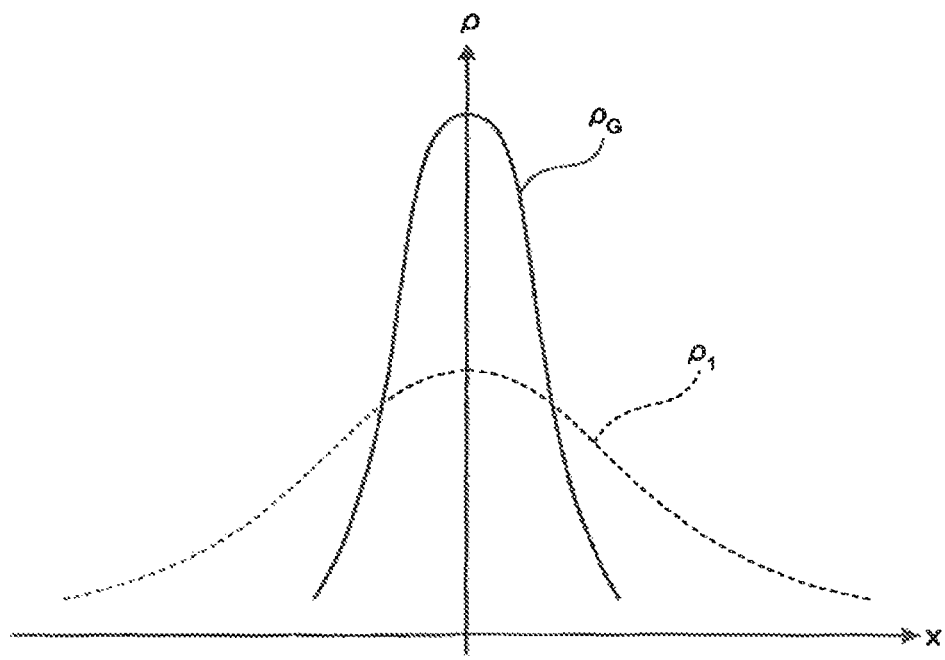
FIG. 8 is a view showing an example of the probability distribution to be provided to the general obstacle.

Although the general obstacle shall maintain the present status, and the general obstacle-course predicting unit 6 generates one course in the first embodiment, it is also possible to predict the course assuming that the general obstacle may also take a plurality of courses with a predetermined probability. In this case, it is preferable to adopt the probability distribution, which is unimodal and has a spatial extent smaller than that of the specific obstacle. FIG. 8 is a view showing an example of the probability distribution to be provided to the general obstacle when the probability distribution of the specific obstacle is $\rho_1$ shown in FIG. 4. The probability distribution curve $\rho_G$ shown in FIG. 8 shows a distribution of which dispersion is smaller than that of the probability distribution curve $\rho_1$ of the specific obstacle and possibility of selecting the course in the straight through direction or in the vicinity thereof is significantly high. When using such a probability distribution curve $\rho_G$, a probability density function $\rho_3(x)$ defined by the following equation (1) may be applied as the probability distribution corresponding to a probability distribution curve $\rho_2$ shown in FIG. 6.

[Equation 1]

$$\rho_3(x)=C\rho_1(x)\{1-\theta(\rho_G(x)-\varepsilon)\} \quad (1)$$

wherein, C represents a normalization constant, $\theta(x)$ represents a function satisfying an equation $\theta(x)=0(x<0), 1(x\geq0)$, and $\varepsilon$ represents a positive constant.

Figure 9:
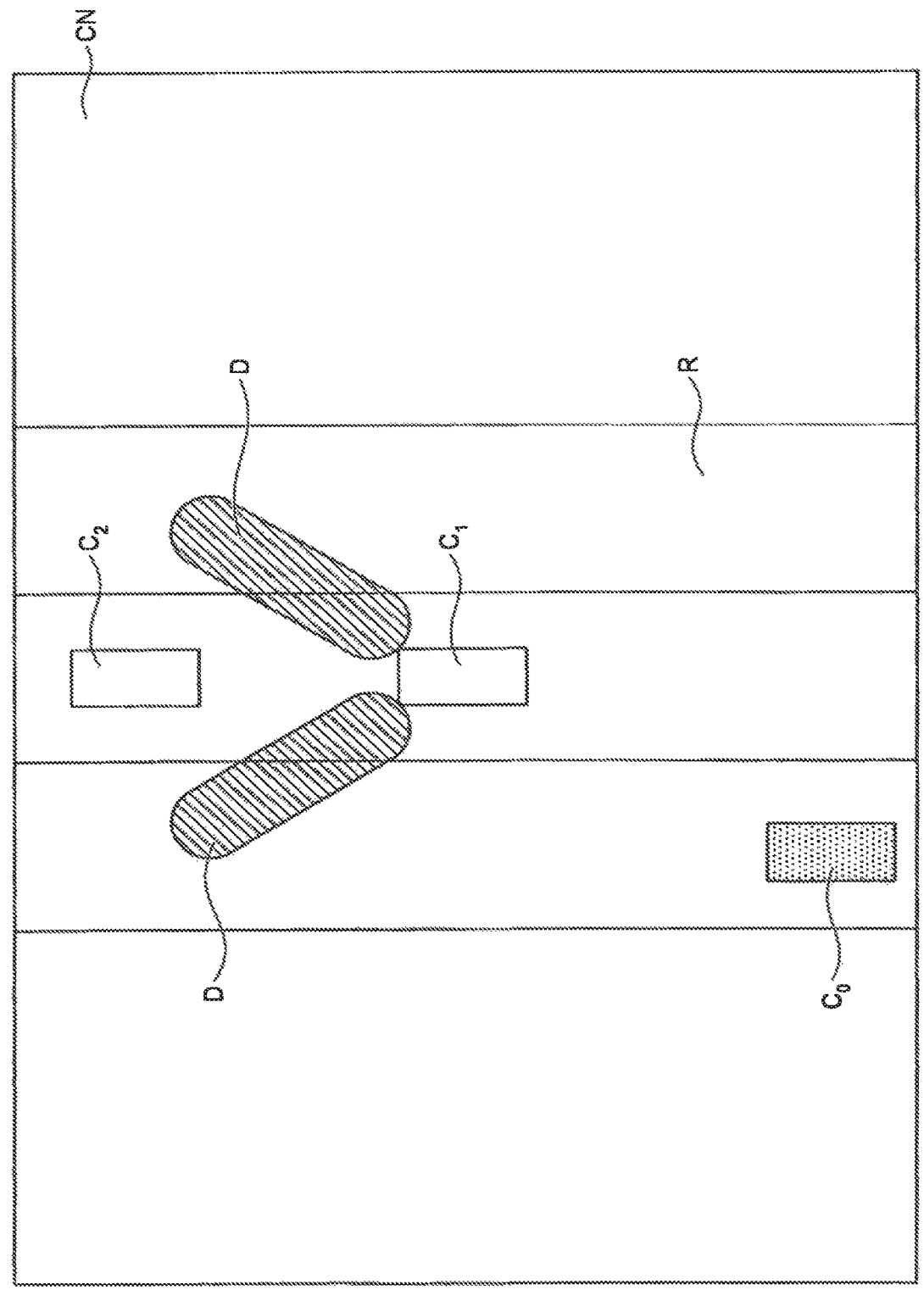
FIG. 9 is a view showing another display output example of a course predicted result of the specific obstacle in the display unit.

Also, the course predicted result of the specific obstacle may be displayed by allowing a display screen CN (refer to FIG. 7) of a car navigation system installed in the subject vehicle $C_0$ to have a function of the display unit 92. FIG. 9 is a screen showing the area D in which it is predicted that the vehicle $C_1$, which is the specific obstacle, travels with the probability not smaller than the predetermined value in this case.

Meanwhile, although the preceding vehicle traveling in the same direction as the subject vehicle is described as the obstacle in the above-described description, it is also possible to consider the following vehicle traveling in the same direction as the subject vehicle as the obstacle. Also, it is possible that an opposing vehicle traveling in a direction opposed to the subject vehicle is considered as the obstacle. Further, it is possible that a stationary object is considered as the obstacle.

Second Embodiment

A second embodiment of the present invention is characterized in that a variation in position, which the specific obstacle specified as in the above-described first embodiment may take with time, is generated as a trajectory in space-time composed of time and space to perform the course prediction using the generated trajectory.

Figure 10:
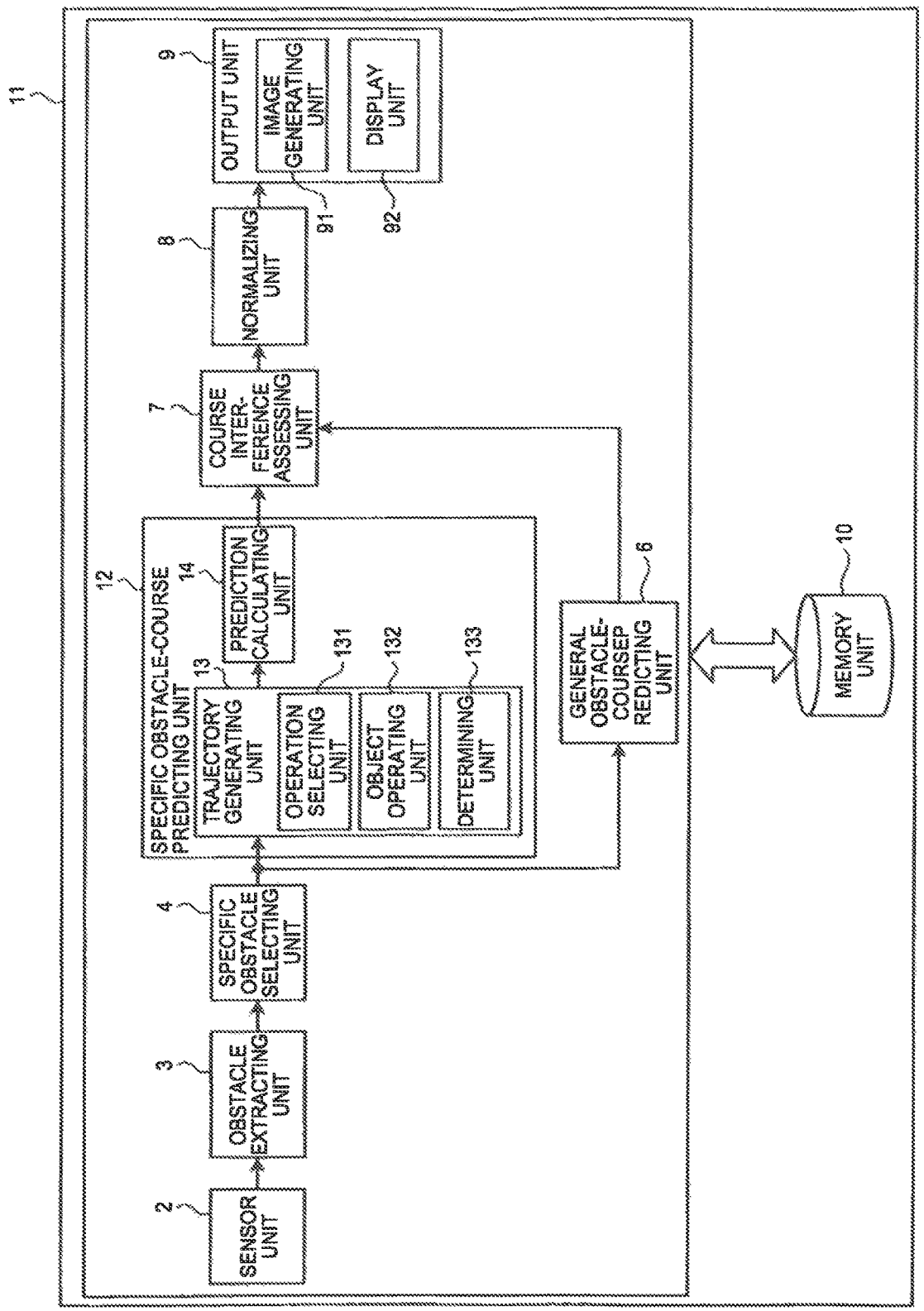
FIG. 10 is a block diagram showing a functional configuration of an obstacle course prediction apparatus according to a second embodiment of the present invention.

FIG. 10 is a block diagram showing a functional configuration of an obstacle course prediction apparatus according to the second embodiment. In an obstacle course prediction apparatus 11 shown in this drawing, the configuration is the same as that of the obstacle course prediction apparatus 1 according to the above-described first embodiment, except for a specific obstacle-course predicting unit 12. Therefore, the same reference numerals are given to portions having the same functions as those of the obstacle course prediction apparatus 1.

The specific obstacle-course predicting unit 12 has a trajectory generating unit 13 for generating the variation in position, which the specific obstacle selected by the specific obstacle selecting unit 4 may take with time, as the trajectory in the space-time composed of time and space, and a predictive calculating unit 14 for performing the probabilistic prediction calculation of the course of the specific obstacle by using the trajectory of the specific obstacle output from the trajectory generating unit 13.

The trajectory generating unit 13 is for predictively generating the trajectory, which the specific obstacle may take until a predetermined time period has passed, and has an operation selecting unit 131 for selecting an operation to allow the specific obstacle to virtually move on simulations from a plurality of operations, an object operating unit 132 for performing the operation selected by the operation selecting unit 131 for a predetermined time period, and a determining unit 133 for determining whether the position and the internal state of the specific obstacle after being operated by the object operating unit 132 satisfy predetermined conditions or not.

Next, the obstacle course prediction method according to the second embodiment of the present invention is described. The obstacle course prediction method according to the second embodiment is the same as the obstacle course prediction method according to the above-described first embodiment, except for the prediction process of the course of the specific obstacle (refer to the flowchart in FIG. 2). Therefore, in the following description, the course prediction process of the specific obstacle (corresponding to the step S4 in FIG. 2) is described in detail.

Figure 11:
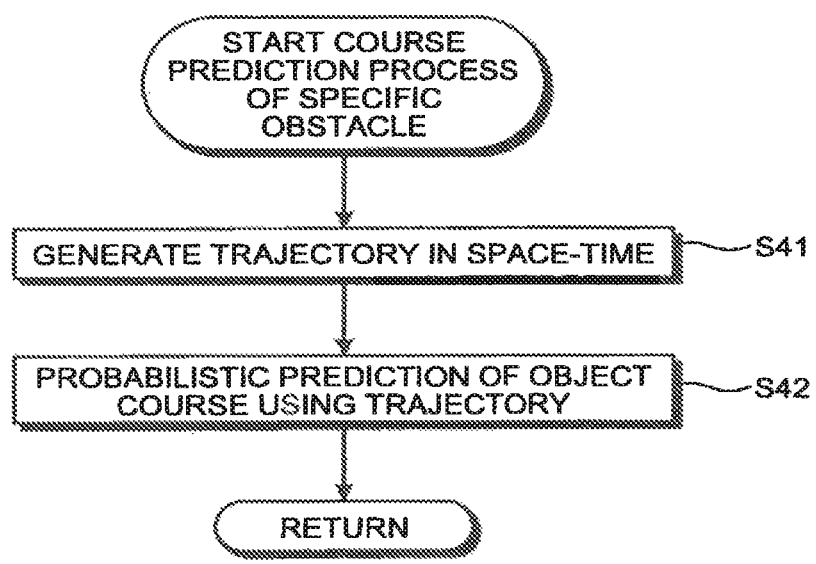
FIG. 11 is a flowchart showing an overview of a course prediction process of a specific obstacle in an obstacle course prediction method according to the second embodiment of the present invention.
Figure 12:
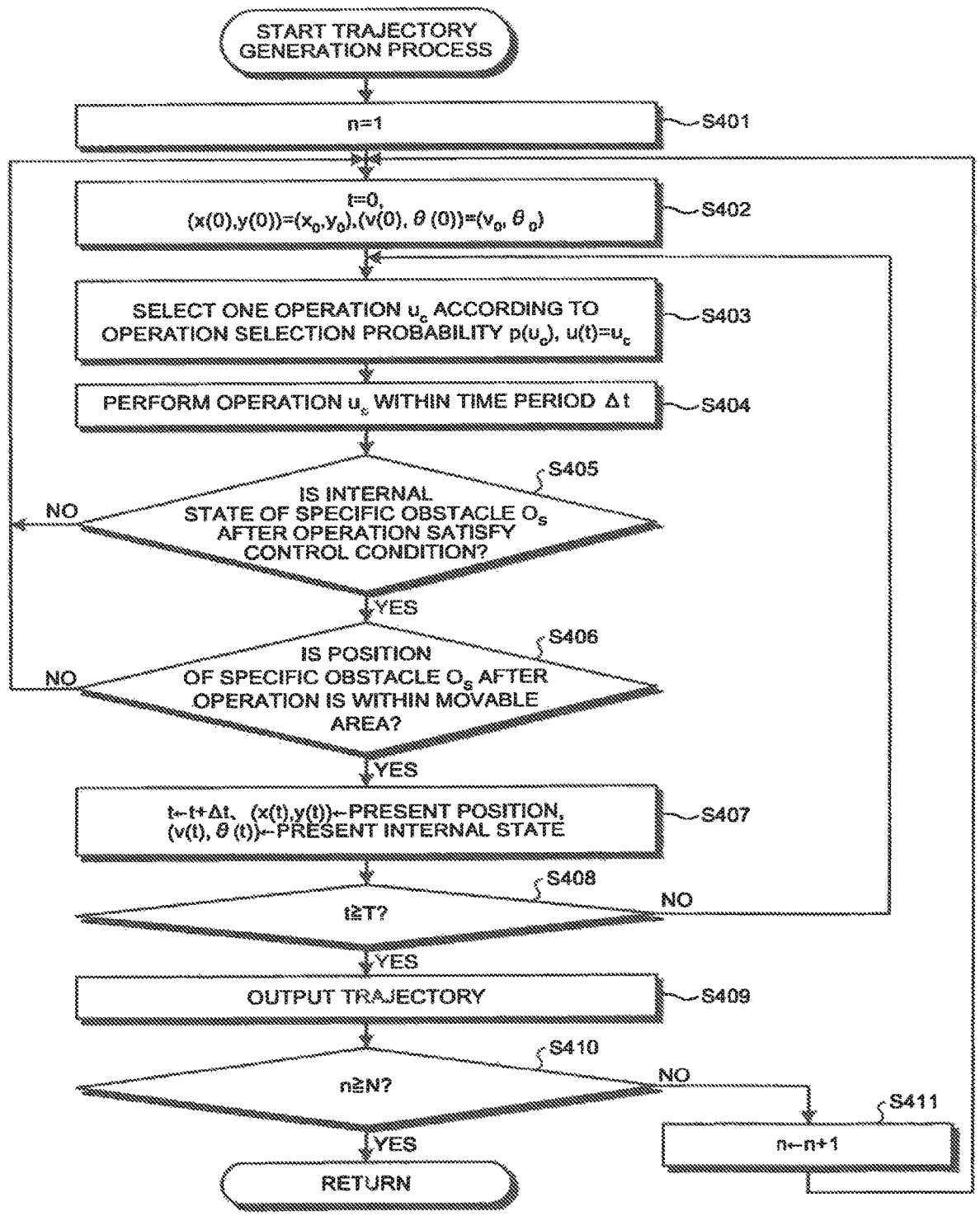
FIG. 12 is a flowchart showing a detail of a trajectory generation process of the specific obstacle.

FIG. 11 is a flowchart showing an overview of the course prediction process of the specific obstacle. First, the trajectory generating unit 13 generates a plurality of trajectories of the specific obstacle (step S41). FIG. 12 is a flowchart showing a detail of the trajectory generation process by the trajectory generating unit 13. In FIG. 12, calculation to generate the trajectory for the specific obstacle $O_S$ detected by the sensor unit 2 is performed N times (N is a natural number). Also, time to generate the trajectory (trajectory generating time) is set to $T(>0)$. By appropriately defining the trajectory generating time T (and an operation time $\Delta t$ to be described later), it becomes possible to perform a set of course prediction processes in a practical calculation time period.

The trajectory generating unit 13 first performs initialization in which a value of a counter n indicating the number of trajectory generation for the specific obstacle $O_S$ (step S401)

Next, the trajectory generating unit 13 reads the result detected by the sensor unit 2 from the memory unit 10, and makes the read detected result an initial state (step S402). Specifically, a time t is set to 0, and an initial position (x(0), y(0)) and an initial internal state (v(0), θ(0)) of the specific obstacle $O_S$ are made input information $(x_3, y_0)$ and $(v_0, \theta_0)$ from the sensor unit 2, respectively.

Consecutively, the operation selecting unit 131 selects one operation from a plurality of selectable operations according to an operation selection probability provided to each operation in advance, as an operation u(t) to be performed within a time period Δt thereafter (step S403). An operation selection probability $p(u_c)$ of selecting an operation $u_c$ is defined, for example, by associating an element of operation set $\{u_c\}$ selectable as u(t) with a predetermined random number. In this sense, the operation selection probability $p(u_c)$ different from each operation $u_c$ may be provided, or equivalent probability may be provided for all the elements of the operation set $\{u_c\}$. In the latter case, an equation $p(u_c)=1/$(total number of selectable operations) is satisfied. Meanwhile, it is also possible to define the operation selection probability $p(u_c)$ as a function dependent on the position and the internal state of the specific obstacle $O_S$ and an ambient road environment.

In general, the operation $u_c$ is composed of a plurality of elements, and the contents of the selectable operation vary according to the type of the specific obstacle $O_S$. For example, when the specific obstacle $O_S$ is the four-wheeled vehicle, an accelerated velocity and an angular velocity of the four-wheeled vehicle are defined by a steering control and a degree of pressure on an accelerator pedal. In view of this, the operation $u_c$ performed for the specific obstacle $O_S$, which is the four-wheeled vehicle, is defined by the element including the accelerated velocity and the angular velocity. On the other hand, when the specific obstacle $O_S$ is a person, the operation $u_c$ may be specified by the velocity.

A more specific setting example of the operation $u_c$ is as follows. When the specific obstacle $O_S$ is the vehicle, the acceleration is in a range from −10 to +30 (km/h/sec) and a steering angel is in a range from −7 to +7 (deg/sec) (directions thereof are specified by a sign), and when the specific obstacle $O_S$ is the person, the velocity is in a range from 0 to 36 (km/h) and a direction is in a range from 0 to 360 (deg). Meanwhile, the amounts described herein are continuous volumes. In such a case, the number of elements of each operation is made finite by performing an appropriate discretization to compose the operation set $\{u_c\}$.

After that, the object operating unit 132 allows the operation $u_c$ selected at the step S403 to be performed for the time period Δt (step S404). Although the time period Δt is preferably smaller in terms of accuracy, this may be practically set to a value about 0.1 to 0.5 (sec). Meanwhile, in the following description, a trajectory generating time T shall be integral multiplication of Δt; however, a value of T may be made variable according to the velocity of the specific obstacle $O_S$ and is not necessarily the integral multiplication of Δt.

Next, the determining unit 133 determines whether the internal state of the specific obstacle $O_S$ after the operation $u_c$ is performed at the step S404 satisfies a predetermined control condition or not (step S405). The control condition to be determined at the step S405 is defined according to the type of the specific obstacle $O_S$, and when the specific obstacle $O_S$ is the four-wheeled vehicle, for example, this is defined by the area of the velocity after the operation at the step S404 and the maximum vehicle G of the acceleration velocity after the operation at the step S404.

As a result of the determination at the step S405, when the internal state of the specific obstacle $O_S$ satisfies the predetermined control condition (Yes at the step S405), the determining unit 133 determines whether the position of the specific obstacle $O_S$ after the operation $u_c$ is performed is within a movable area or not (step S406). The movable area to be determined at the step S406 indicates the area such as the road (including a roadway and a pathway). Hereinafter, a case in which the object is located within the movable area is represented as "to satisfy mobile condition".

As a result of the determination at the step S406, when the specific obstacle $O_S$ is located within the movable area (Yes at the step S406), the trajectory generating unit 13 increments the time by Δt (t←t+Δt) to make the position and the internal state after the operation at the step S404 to (x(t), y(t)) and (v(t), θ(t)), respectively (step S407).

Meanwhile, when there is any condition, which is not satisfied, at the steps S405 and S406 (No at the step S405 or No at the step S406), the procedure returns back to the step S402.

The above-described processes at the steps S402 to S407 are repeated until reaching the trajectory generating time T. That is to say, when the time t newly defined at the step S407 does not reach T (No at the step S408), the procedure returns back to the step S403 to repeat the process. On the other hand, when the time t newly defined at the step S407 reaches T (Yes at the step S408), the trajectory for the specific obstacle $O_S$ is output and stored in the memory unit 10 (step S409).

Figure 13:
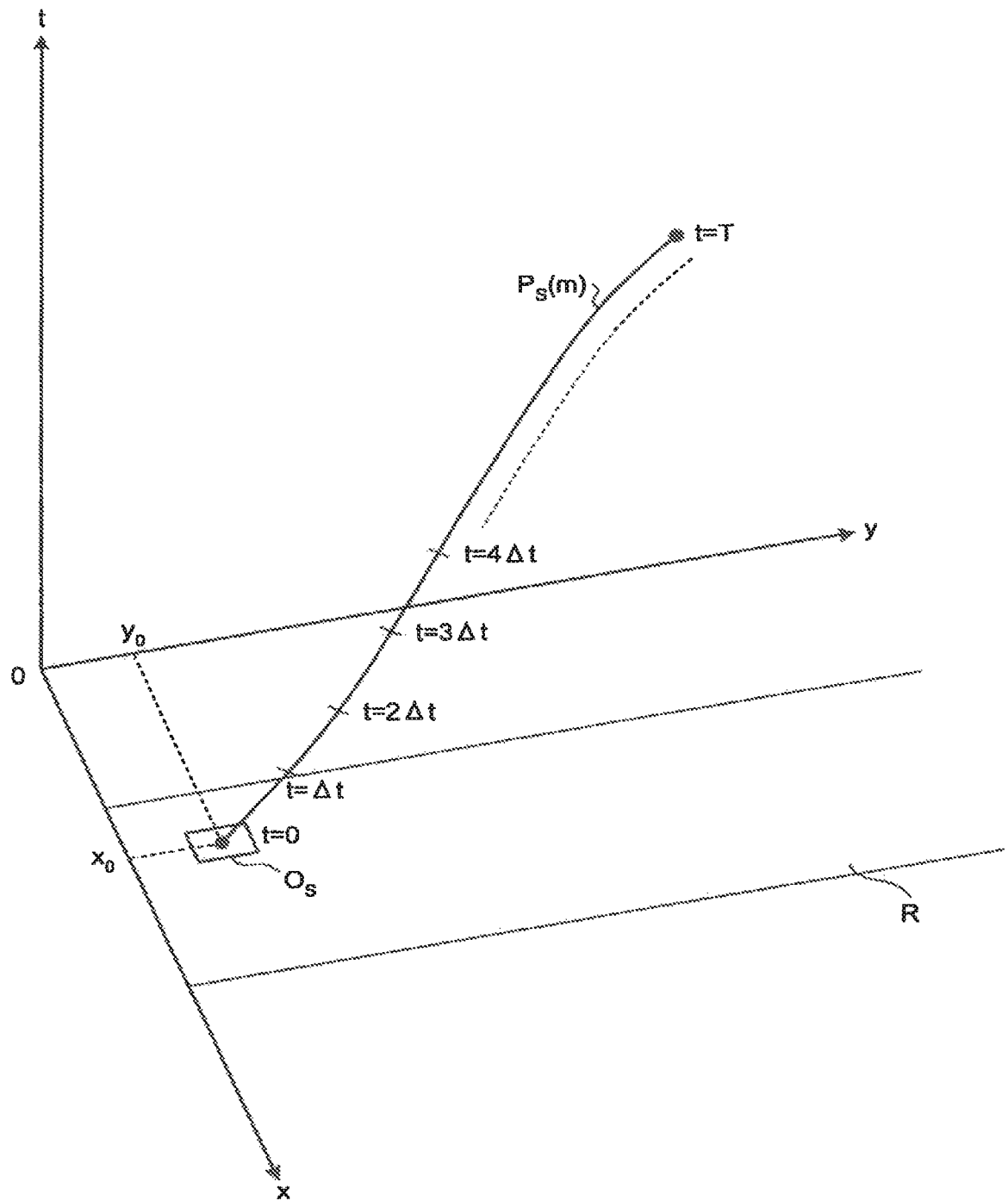
FIG. 13 is a view schematically showing a trajectory of the specific obstacle.

FIG. 13 is a view schematically showing the trajectory of the specific obstacle $O_S$ generated by repeating the set of processes from the step S403 to the step S407 with the time t=0, Δt, 2Δt, . . . , T. A trajectory $P_S$ (m) (1≤m≤N, m is the natural number) shown in this drawing passes through a three-dimensional space-time (x, y, t) of two space dimension (x,y) and one time dimension (t). The predicted course of the specific obstacle $O_S$ in the two-dimensional space (x,y) may be obtained by projecting the trajectory $P_S$ (m) on an x-y plane.

After the step S409, when the value of the counter n does not reach N (No at the step S410), the trajectory generating unit 13 increments the value of the counter n by 1 (step S411), and the procedure returns back to the step S402 to repeat the above-described processes at the steps S402 to S408 until reaching the trajectory generating time T.

Figure 14:
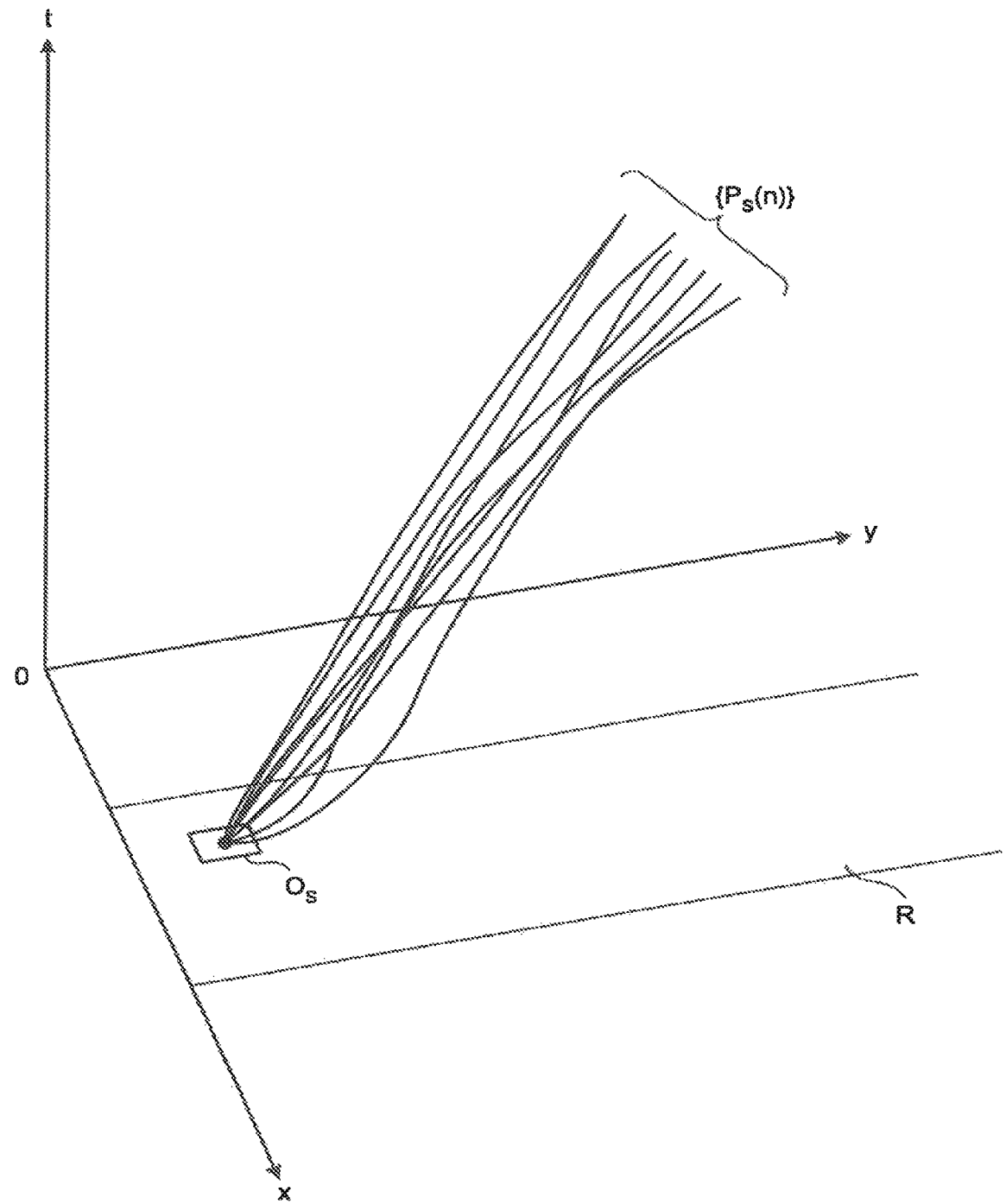
FIG. 14 is a view schematically showing a trajectory set generated for the specific obstacle in a three-dimensional space-time.

When the counter n reaches N at the step S410 (Yes at the step S410), generation of all the trajectories for the specific obstacle $O_S$ is completed. FIG. 14 is a view schematically showing the trajectory set $\{P_S(n)\}$ composed of N trajectories $P_S(1)$, $P_S(2)$, . . . , $P_S(N)$ generated for the specific obstacle $O_S$ in the three-dimensional space-time. A starting point, that to say, an initial position $(x_0, y_0, 0)$ of each trajectory, which are elements of the trajectory set $\{P_S(n)\}$, are the same (refer to the step S402). Meanwhile, FIG. 14 is absolutely the schematic view, and the value of N may be the value of several hundreds to several tens of thousands, for example.

When the counter n reaches N at the step S410, this means that the trajectory generation is completed, so that the trajectory generation process at the step S41 shown in FIG. 11 is finished.

In FIG. 14, density of presence probability of the specific obstacle $O_S$ in each area of the space-time (hereinafter, referred to as "space-time probability density") is provided as density per unit volume of the trajectory set $\{P_S(n)\}$ in each area of the space-time. Therefore, it becomes possible to obtain the probability that the specific obstacle $O_S$ passes through the predetermined area in the three-dimensional space-time, by using the trajectory set $\{P_S(n)\}$ composed of the trajectory generation process at the step S41. Meanwhile, the space-time probability density is absolutely a probability concept in the space-time, so that the total sum of a value of one object in the space-time is not necessarily 1.

When setting a specific value of the trajectory generation time T as a fixed value in advance, this is preferably a value such that when the trajectory is generated to a point larger than the value T, the probability density distribution in space-time becomes uniform and there is no meaning in calculating. For example, when the object is the four-wheeled vehicle and when the four-wheeled vehicle normally travels, this may be set at most about T=5 (sec). In this case, when the operation time period Δt at the step S404 is set to about 0.1 to 0.5 (sec), a set of processes from the step S403 to the step S407 are repeated 10 times to 50 times for generating one trajectory $P_S(m)$.

Meanwhile, it is preferable to set the trajectory generation times T different from one type of the road to the next such as an express highway, a general road, and a two-track road, and to switch by a method to read the type of the road now traveling from map data using positional data and a method to read the type of the road by a road recognition device applying image recognition or the like.

Also, it is preferable to statistically evaluate the probability density distribution in the space-time by using the trajectory calculated up to the trajectory generation time T, and to adaptively control such as to reduce the trajectory generation time T when the distribution is uniform and to increase the generation time when the distribution is not uniform.

After the above-described trajectory generation process for the specific obstacle, the specific obstacle-course predicting unit 12 probabilistically predicts the course, which the specific obstacle may take (step S42). Although hereinafter, a case in which probability that the specified trajectory $P_S(m)$ is selected from the trajectory set $\{P_S(n)\}$ generated for the specific obstacle $O_S$ is obtained as the specific prediction calculation process in the prediction calculating unit 14 is described; however, it goes without saying that the prediction calculation is merely one example.

When N trajectories of the specific obstacle $O_S$ are generated, probability $p(P_S(m))$ that one trajectory $P_S(m)$ out of them becomes an actual trajectory is calculated as follows. First, when an operation sequence $\{u_m(t)\}$ to realize the trajectory $P_S(m)$ of the specific obstacle is $\{u_m(0), u_m(\Delta t), u_m(2\Delta t), \ldots, u_m(T)\}$, probability that the operation $u_m(t)$ is selected at the time t is $p(u_m(t))$, so that probability that the operation sequence $\{u_m(t)\}$ is executed at t=0 to T may be obtained as

[Equation 2]

$$p(u_m(0)) \cdot p(u_m(\Delta t)) \cdot p(u_m(2\Delta t)) \ldots p(u_m(T)) = \prod_{t=0}^{T} p(u_m(t)). \quad (2)$$

Therefore, when the N trajectory set $\{P_S(n)\}$ is provided to the specific obstacle $O_S$, the probability $p(P_S(m))$ that one trajectory $P_S(m)$, which the specific obstacle $O_S$ may take, is represented as

[Equation 3]

$$p(P_s(m)) = \frac{\prod_{t=0}^{T} p(u_m(t))}{\sum_{n=1}^{N} \left( \prod_{t=0}^{T} p(u_n(t)) \right)}. \quad (3)$$

Herein, when all the operations $u_m(t)$ are selected with equal probability $p_0$ (wherein $0<p_0<1$), the equation (2) becomes

[Equation 4]

$$\prod_{t=0}^{T} p(u_m(t)) = p_0^h. \quad (4)$$

Herein, a natural number h is a total number of the operation time periods Δt with t=0 to T, that is to say, the number of operations. Therefore, the total sum of the probability of the trajectory $P_s(m)$ included in N trajectories, which the specific obstacle $O_s$ may take, becomes $Np_0^h$, and probability $p(P_s(m))$ that one trajectory $P_s(m)$ is selected out of them is obtained as

[Equation 5]

$$p(P_s(m)) = \frac{1}{N} \quad (5)$$

by substituting the equation (4) to the equation (3). That is to say, the probability $p(P_s(m))$ does not depend on the trajectory $P_s(m)$.

After that, the prediction calculating unit 14 obtains the presence probability of the specific obstacle $O_s$ per unit volume in each area of the three-dimensional space-time based on the calculated probability $p(P_s(m))$. The presence probability corresponds to the space-time probability density in the three-dimensional space-time of the trajectory set $\{P_s(n)\}$, and this is generally large in the area in which density of the passing trajectories is high. The calculation result in the prediction calculating unit 14 is output to the course interference assessing unit 7.

Figure 15:
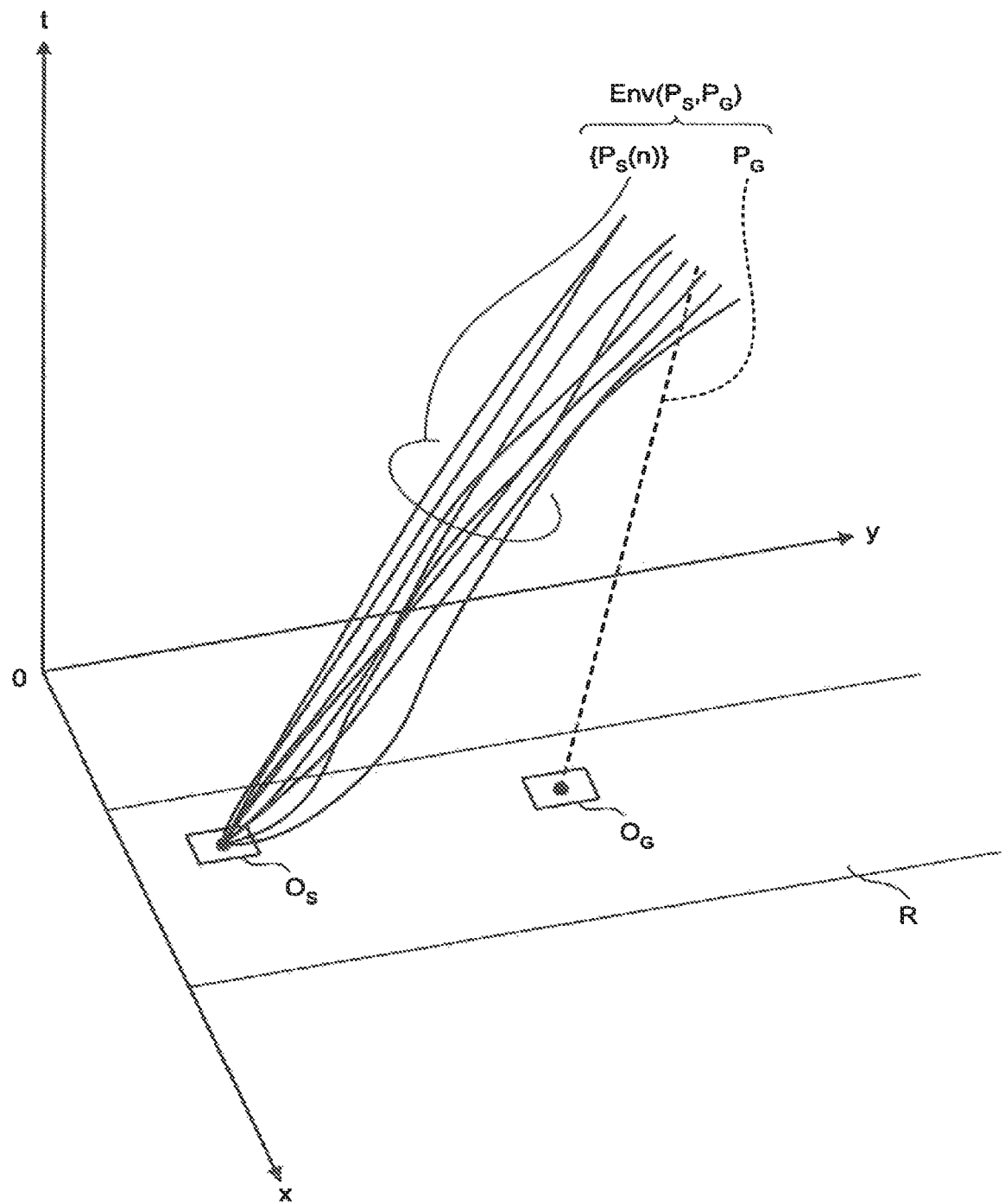
FIG. 15 is a view schematically showing a configuration example of a space-time environment formed by adding a predicted course of the general obstacle to the trajectory set of the specific obstacle.

FIG. 15 is a view schematically showing a configuration example of the space-time environment formed by adding the trajectory set $\{P_S(n)\}$ of the specific obstacle $O_S$ and the predicted course of the general obstacle. The space-time environment $Env(P_S, P_G)$ shown in this drawing is composed of the trajectory set $\{P_S(n)\}$ of the specific obstacle $O_S$ (represented by a solid line) and one trajectory $P_G$ of the general obstacle $O_G$ (represented by a broken line).

More specifically, the space-time environment Env ($P_S$, $P_G$) shows the space-time environment in a case in which the general obstacle $O_G$ in addition to the specific obstacle $O_S$ travels on a flat and linear road R such as the express highway in a +y axis direction (the subject vehicle $C_0$ in which the obstacle course prediction apparatus 11 is installed is not included in the space-time environment). Herein, the trajectory is independently generated for each obstacle without considering relationship between the obstacles, so that the trajectories of different objects might intersect in the space-time.

The process thereafter is performed as in the above-described first embodiment. That is to say, the trajectory, which intersects with the trajectory $P_G$ of the general obstacle $O_G$, that is to say, the trajectory on which the specific obstacle $O_S$ and the general obstacle $O_G$ collide with each other is removed from the trajectory set $\{P_S(n)\}$ of the specific obstacle $O_S$, as the interference assessment process between the specific obstacle $O_S$ and the general obstacle $O_G$ (step S6). The collision at that time is defined as in the above-described first embodiment, and includes a case in which the two trajectories get closer to each other with a distance smaller than a predetermined distance according to the type of the obstacle, in addition to a case in which the two trajectories merely have intersection.

After that, the normalizing unit 8 normalizes such that the total sum of the probability of each element of the trajectory set remaining unremoved (non-interference trajectory set) $\{P_S'(n)\}$ becomes 1 to calculate the probability (step S7). Next, the output unit 9 outputs the information based on the probability distribution obtained at the step S7 (step S8).

According to the above-described second embodiment of the present invention, even about the course, which may be taken with high probability when seen on a separate obstacle basis, if this interferes with another obstacle, the prediction may be performed by taking an effect thereof into consideration, by predicting the course, which the obstacle may take, based on the position and the internal state of the obstacle, and at the time of the prediction, probabilistically predicting a plurality of courses of the specific obstacles selected by a predetermined condition and predicting the course of the general obstacle other than those, and when there are a plurality of obstacles, lowering the predicted probability of the course of which distance at the same time from the course, which the general obstacle may take, is smaller than a predetermined value out of a plurality of courses, which the specific obstacle may take, and calculating the probability that each of a plurality of courses of the specific obstacle including the course of which predicted probability is lowered, is realized. Therefore, as in the above-described first embodiment, it becomes possible to appropriately predict the course of the obstacle even under the complicated traffic environment.

Also, according to the second embodiment, by generating the variation in position, which the specific obstacle may take with time, as the trajectory in the space-time composed of time and space, and by probabilistically predicting the course of the specific obstacle by using the generated trajectory, the course of a dynamic object may be predicted with high accuracy.

Meanwhile, in the second embodiment, when performing the trajectory generation process of the specific obstacle in the space-time, the trajectory may be generated by allowing all the selectable operations to be performed. An algorithm realizing such trajectory generation process may be realized by applying a recursive call by depth-first search or breadth-first search, for example. In this case, the number of elements, that is to say, the number of trajectories of the trajectory set $\{P_S(n)\}$ of the specific obstacle $O_S$, is not known until the trajectory generation process for the specific obstacle $O_S$ is finished. Therefore, when generating the trajectory, which each object may take, by fully searching the executable operations, the search method having the optimal calculation amount may be selected according to the number of elements of the operation $u_c(t)$ at the operation time period $\Delta t$ (degree of discretization when the operation $u_c(t)$ is a continuous amount).

In addition, the second embodiment is applicable to a four-dimensional space-time (three space dimensions and one time dimension) as in a case of applying to the vehicle traveling on the road with vertical interval.

Third Embodiment

A third embodiment of the present invention is different from the above-described two embodiments, and is characterized in equally treating all the obstacles, generating the variation in position, which each obstacle may take with time, as the trajectory in the space-time, and predicting the course of the obstacle using the generated trajectory.

Figure 16:
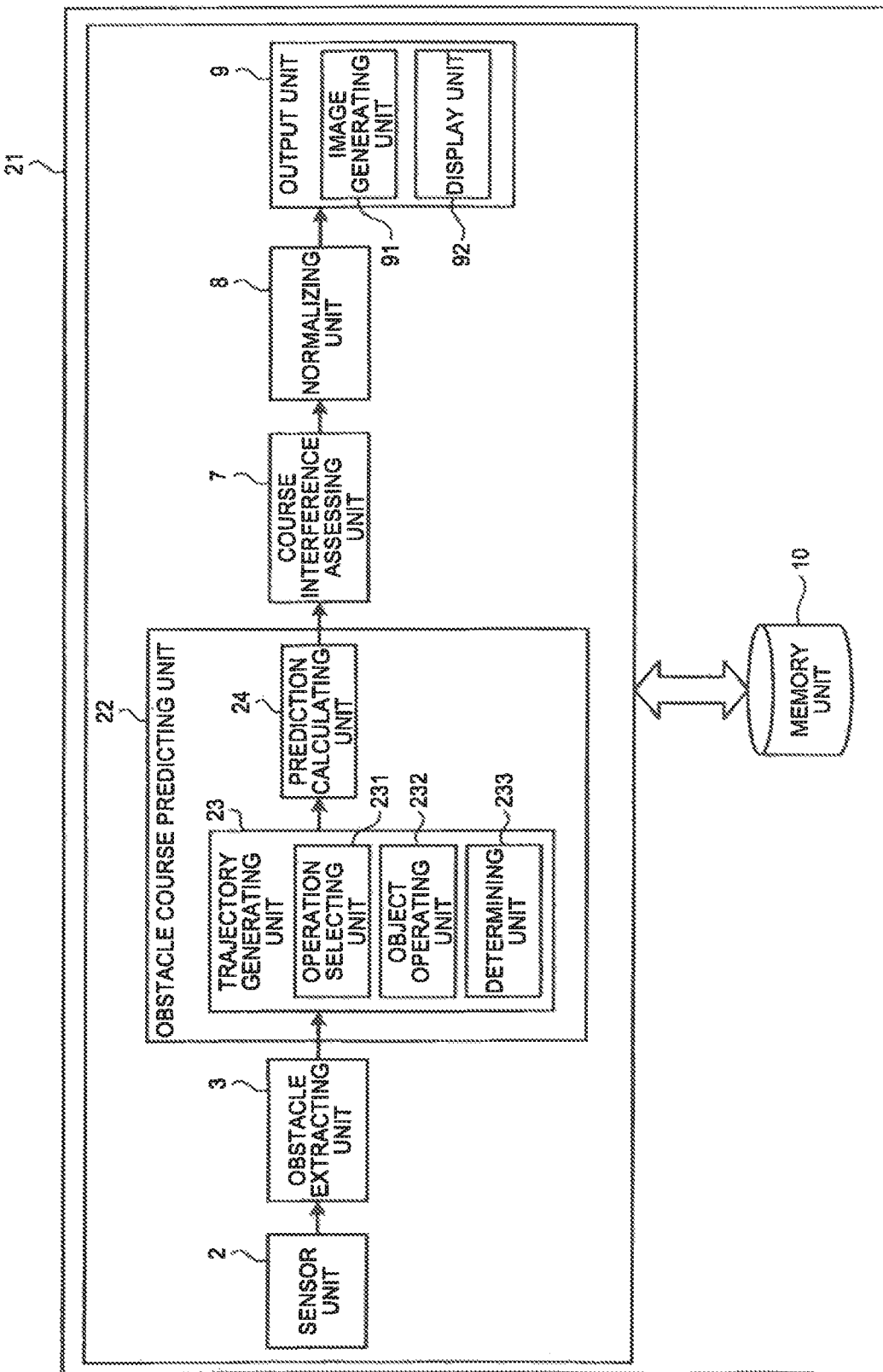
FIG. 16 is a block diagram showing a functional configuration of an obstacle course prediction apparatus according to a third embodiment of the present invention.

FIG. 16 is a block diagram showing a functional configuration of an obstacle course prediction apparatus according to the third embodiment of the present invention. An obstacle course prediction apparatus 21 shown in this drawing has the sensor unit 2, the obstacle extracting unit 3, an obstacle course predicting unit 22 for performing probability prediction of the course of the obstacle extracted by the obstacle extracting unit 3, the course interference assessing unit 7, which assesses interference of the predicted course between the obstacles predicted by the obstacle course predicting unit 22, the normalizing unit 8, the output unit 9, and the memory unit 10. The output unit 9 has the image generating unit 91 and the display unit 92.

The obstacle course predicting unit 22 has a trajectory generating unit 23 for generating the variation in position, which the obstacle extracted by the obstacle extracting unit 3 may take with time, as the trajectory in space-time, and a prediction calculating unit 24 for probabilistically performing a prediction calculation of the course of each obstacle by using the trajectories of a plurality of obstacles output from the trajectory generating unit 23. Out of them, the trajectory generating unit 23 is for predictably generating the trajectory, which the object may take before a predetermined time period has passed, and has an operation selecting unit 231, an object operating unit 232, and a determining unit 233, just as the trajectory generating unit 13 described in the above-described second embodiment.

The obstacle course predicting unit 22 predicts the courses of all the obstacles by equally treating a plurality of obstacles. Also, the course interference assessing unit 7 performs the interference assessment by removing all the courses, which interfere with each other, that is to say, the trajectories, which get closer to each other with a distance smaller than a predetermined distance at the same time, from the predicted courses.

Figure 17:
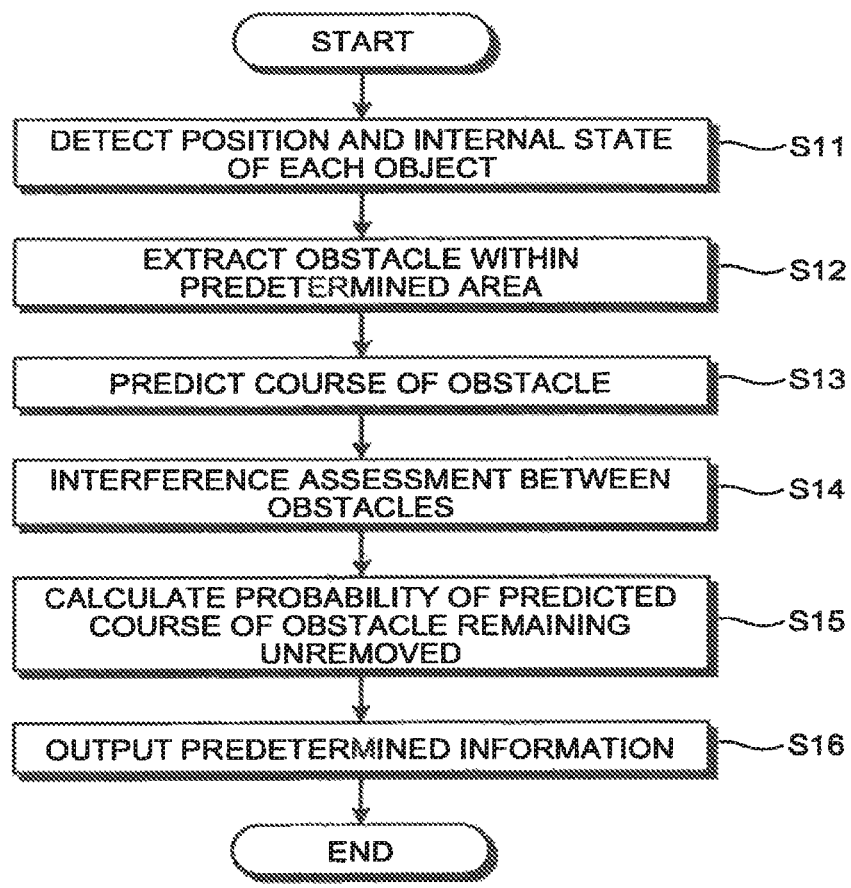
FIG. 17 is a flowchart showing an overview of the process of an obstacle course prediction method according to the third embodiment of the present invention.

Next, the obstacle course prediction method according to the third embodiment is described with reference to a flowchart shown in FIG. 17. First, the sensor unit 2 detects a position of an object within a predetermined area with respect to the subject vehicle and an internal state thereof, and stores the detected information in the memory unit 10 (step S11). In the third embodiment also, the position of the object is represented by the value of the central portion of the object, and the internal state of the object is specified by the velocity (velocity v and direction θ).

After that, the obstacle extracting unit 3 extracts the obstacle within the predetermined area, based on the result detected by the sensor unit 2 (step S12).

Next, the obstacle course predicting unit 22 probabilistically predicts the courses, which a plurality of obstacles extracted by the obstacle extracting unit 3, may take (step S13). A specific course prediction process to be performed for each obstacle at the step S13 is similar to the course prediction process of the specific obstacle in the above-described second embodiment (refer to FIGS. 11 and 12). In the following description, a total number of the obstacles detected by the sensor unit 2 is set to 1, and the calculation to generate the trajectory shall be performed $N_i$ times for one obstacle $O_i$ ($1 \leq i \leq I$, i is a natural number) (I and $N_i$ are natural numbers).

The trajectory generating unit 23 reads the result detected by the sensor unit 2 from the memory unit 10, and sets the read detected result as an initial state. Thereafter, the operation selecting unit 231 selects an operation $u_i$ (t) to be performed within the time period $\Delta t$ after the initial state. At that time, the operation selecting unit 231 selects one operation out of a plurality of selectable operations according to the operation selection probability provided to each operation in advance. Meanwhile, a specific operation $u_{ic}$ is set just as the operation $u_c$ in the above-described second embodiment. Also, an operation selection probability $p(u_{ic})$ to select the operation $u_{ic}$ also is defined as the above-described operation selection probability $p(u_c)$.

After that, the object operating unit 232 allows the operation $u_{ic}$ selected by the operation selecting unit 231 to be performed for the time period $\Delta t$, and the determining unit 233 determines whether the internal state of the object $O_i$ after the operation $u_{ic}$ is performed satisfies a predetermined control condition or not and determines whether the position of the object $O_i$ after the operation $u_{ic}$ is performed is within the movable area or not. The trajectory generating unit 23 increments the time by $\Delta t$ ($t \leftarrow t+\Delta t$) only when the position and the internal state of the object $O_i$ after the operation $u_{ic}$ is finished satisfy all the conditions, as a result of determination at the determining unit 233, to set the position and the internal state after the operation to $(x_i(t), y_i(t))$ and $(v_i(t), \theta_i(t))$, respectively. By repeating the process $N_i$ times, the process for one obstacle $O_i$ is finished. After that, the similar process is performed for another obstacle $O_i$.

Figure 18:
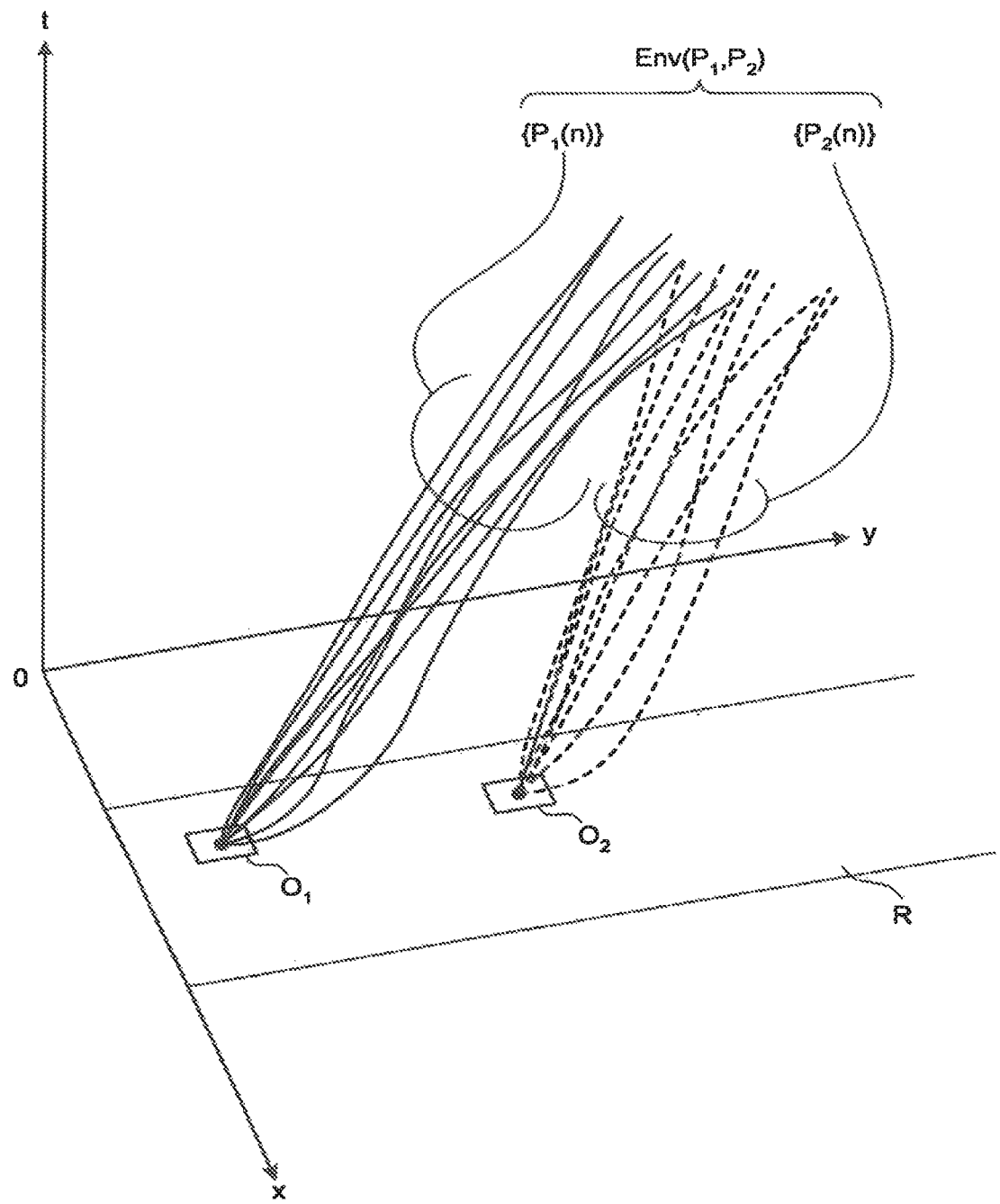
FIG. 18 is a view schematically showing a configuration example of the space-time environment obtained by the trajectory generation process of the obstacle course prediction method according to the third embodiment of the present invention.

The trajectory generating unit 23 performs the trajectory generation process for all the obstacles, thereby the space-time environment composed of trajectory set, which a plurality of objects present within the predetermined area in the three-dimensional space-time may take, is formed. FIG. 18 is a view schematically showing a configuration example of the space-time environment. The space-time environment Env ($P_1, P_2$) shown in the drawing is formed of the trajectory set $\{P_1(n)\}$ of the obstacle $O_1$ (indicated by a solid line in FIG. 18) and the trajectory set $\{P_2(n)\}$ of the obstacle $O_2$ (indicated by a broken line in FIG. 18). More specifically, the space-time environment Env ($P_1, P_2$) shows the space-time environment when two obstacles $O_1$ and $O_2$ travel on the flat and linear road R such as the express highway in the +y axis direction. In the third embodiment, the trajectory is generated for each object without considering the correlation between the objects, so that the trajectories of different objects might intersect with each other in space-time.

In FIG. 18, the space-time probability density of the obstacle $O_i$ in each area in space-time is provided as density per unit volume of the trajectory set $\{P_i(n)\}$ (i=1, 2) in each area in space-time. Therefore, in the second embodiment, it is possible to obtain the probability that the obstacle $O_i$ passes through a predetermined area in the three-dimensional space-time.

Next, the prediction calculating unit 24 probabilistically predicts the course, which each obstacle may take. The prediction calculation for each obstacle at that time is substantially the same as that at the step S42 in the above-described second embodiment. Therefore, when the trajectory set $\{P_i(n)\}$ is provided, the probability $p(P_i(m))$ that one trajectory $P_i$ (m) belonging to this set is selected is represented as

[Equation 6]

$$p(P_i(m)) = \frac{\prod_{t=0}^{T} p(u_{im}(t))}{\sum_{n=1}^{N_i} \left( \prod_{t=0}^{T} p(u_{in}(t)) \right)}. \quad (6)$$

Herein, when all the operations $u_{im}(t)$ are selected with equal probability $p_0$ ($0<p_0<1$), the probability $p(P_i(m))$ that one trajectory $p_i(m)$ is selected is represented as

[Equation 7]

$$p(P_i(m)) = \frac{1}{N_i}, \quad (7)$$

and the probability $p(P_i(m))$ does not depend on the trajectory $p_i(m)$. Meanwhile, in the equation (7), when the numbers of trajectories to be generated for all the objects are the same (N), since $N_1=N_2= \ldots =N_I=N$ (constant), $p(P_i(m))=1/N$, and this is constant regardless of the obstacle $O_i$. Therefore, in this case, it becomes possible to simplify the prediction calculation in the prediction calculating it 24 to execute a predetermined prediction calculation more rapidly, by normalizing the value of the probability $p(P_i(m))$ to 1.

After that, the prediction calculating unit 24 obtains the presence probability of the obstacle $O_i$ per unit volume in each area in the three-dimensional space-time, based on the probability $p(P_i(m))$ calculated for each obstacle $O_i$ (i=1, 2, . . . , I). The presence probability corresponds to the space-time probability density of the trajectory set $\{P_i(n)\}$ in three-dimensional space-time, and the presence probability is generally high in the area in which density of passing trajectories is high.

After the above-described obstacle course prediction process at the step S13, the course interference assessing unit 7 performs the interference assessment between the obstacles (step S14). When performing the course interference assessment, the trajectories intersecting with each other are removed from the trajectory set $\{P_1(n)\}, \{P_2(n)\}, \ldots, \{P_I(n)\}$ for all the obstacles. Meanwhile, in the third embodiment also, the definition of the intersection of the trajectories is the same as that of the above-described second embodiment.

After that, the courses of all the obstacles remaining unremoved are calculated as the course predicted probability of all the obstacles under the space-time environment (step S15). At that time, the normalizing unit 8 normalizes such that the total sum of the probabilities of all the courses remaining unremoved becomes 1.

Finally, the output unit 9 outputs predetermined information based on the predicted course probabilities of all the obstacles calculated at the step 15 (step 16). For example, it is preferable that the area in which the course is taken probability larger than the predetermine value is displayed. The display method on the display unit 92 in this case may be the superimposed display on the front glass, or may be the display on the display screen CN of the car navigation system, described in the above-described first embodiment.

Meanwhile, the obstacle course prediction method according to the third embodiment is applicable to the four-dimensional space-time (three space dimensions and one time dimension) as in the above-described second embodiment.

According to the above-described third embodiment of the present invention, even about the course, which may be taken with high probability when seen on a separate obstacle basis, if this interferes with another obstacle, the prediction may be performed by taking an effect thereof into consideration, by predicting the course, which the obstacle may take, based on the position and the internal state of the obstacle, and at the time of the prediction, probabilistically predicting a plurality of courses of the obstacles, and when there are a plurality of obstacles, lowering the probability of taking the course of which distance from the course of the different obstacle at the same time is smaller than a predetermined value out of the courses, which a plurality of obstacles may take, and calculating the probability that each of all the courses of a plurality of obstacle including the course of which predicted probability is lowered, is realized. Therefore, it becomes possible to appropriately predict the course of the obstacle even under the complicated traffic environment.

Also, according to the third embodiment, the course of the dynamic object may be predicted with high accuracy by generating the variation in position, which the obstacle may take with time, as a plurality of trajectories in space-time composed of time and space and probabilistically predicting the course, which all the obstacles may take, by using a plurality of generated trajectories.

Meanwhile, when predicting the course of the obstacle in the third embodiment, any of conventionally known probabilistic method may be applied.

Fourth Embodiment

A fourth embodiment of the present invention is characterized in generating a course of the subject vehicle in addition to predicting the course of the specific obstacle as in the above-described first embodiment, and calculating collision probability of the specific obstacle and the subject vehicle.

Figure 19:
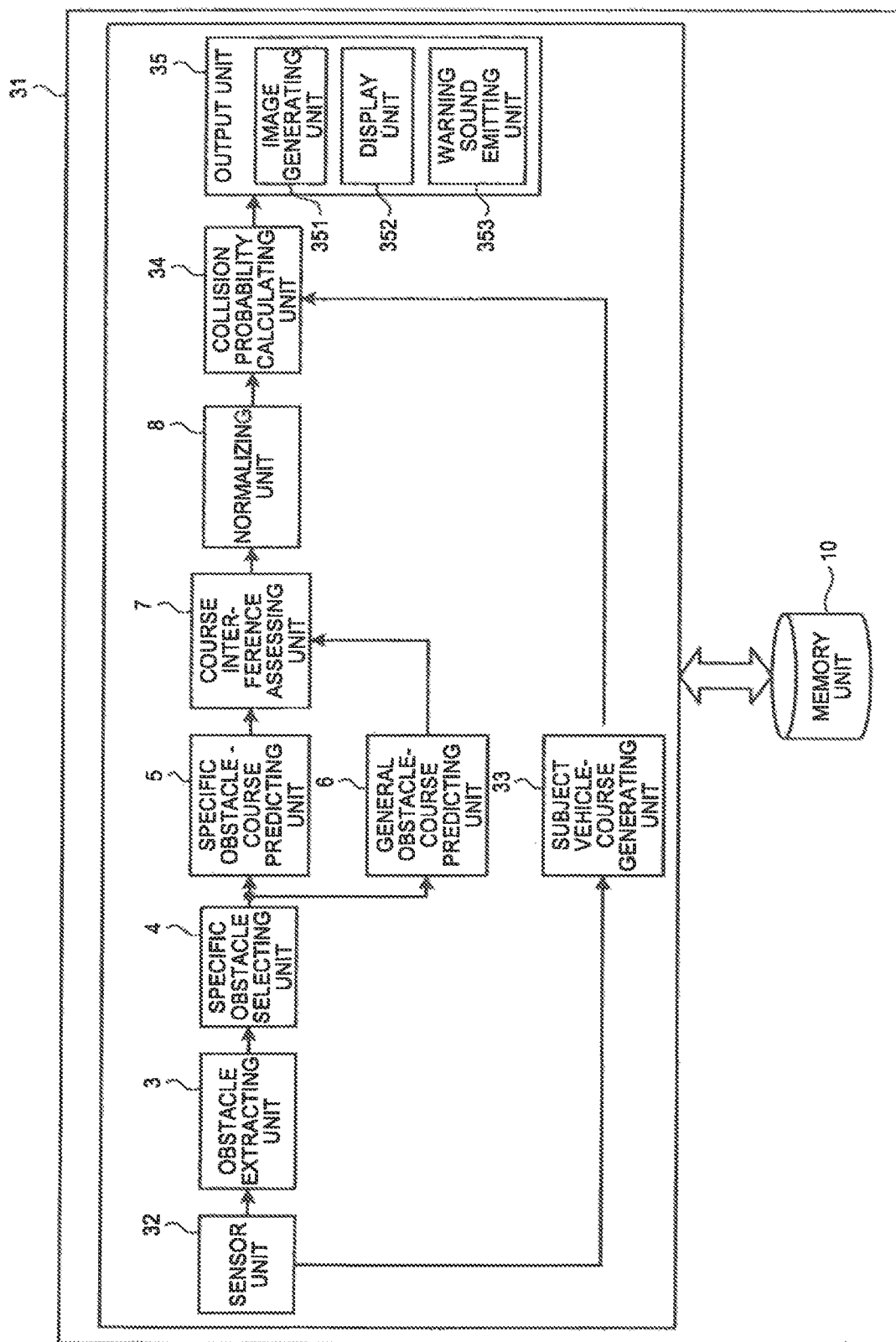
FIG. 19 is a block diagram showing a functional configuration of an obstacle course prediction apparatus according to a fourth embodiment of the present invention.

FIG. 19 is a block diagram showing a functional configuration of the obstacle course prediction apparatus according to the fourth embodiment. An obstacle course prediction apparatus 31 shown in this drawing detects the position and the internal state of the object present within the predetermined area, and has a sensor unit 32 for detecting the position and the internal state of the subject vehicle, a subject vehicle-course generating unit 33 for generating the course of the subject vehicle from the present position, a collision probability calculating unit 34 for calculating the collision probability of the subject vehicle and the specific obstacle, and an output unit 35 for outputting information regarding the collision probability of the subject vehicle and the specific obstacle calculated by the collision probability calculating unit 34. The output unit has an image generating unit 351 for generating an image based on the collision probability calculated by the collision probability calculating unit 34, a display unit 352 for display outputting information including the image generated by the image generating unit 351, and a warning sound emitting unit 353 for emitting a warning sound (including voice) when the collision probability of the subject vehicle course generated by the own course generating unit 33 and the specific obstacle is larger than a predetermined threshold value. A configuration of the obstacle course prediction apparatus 31 other than that described herein is the same as the configuration of the obstacle course prediction apparatus 1 according to the above-described first e embodiment (refer to FIG. 1).

Figure 20:
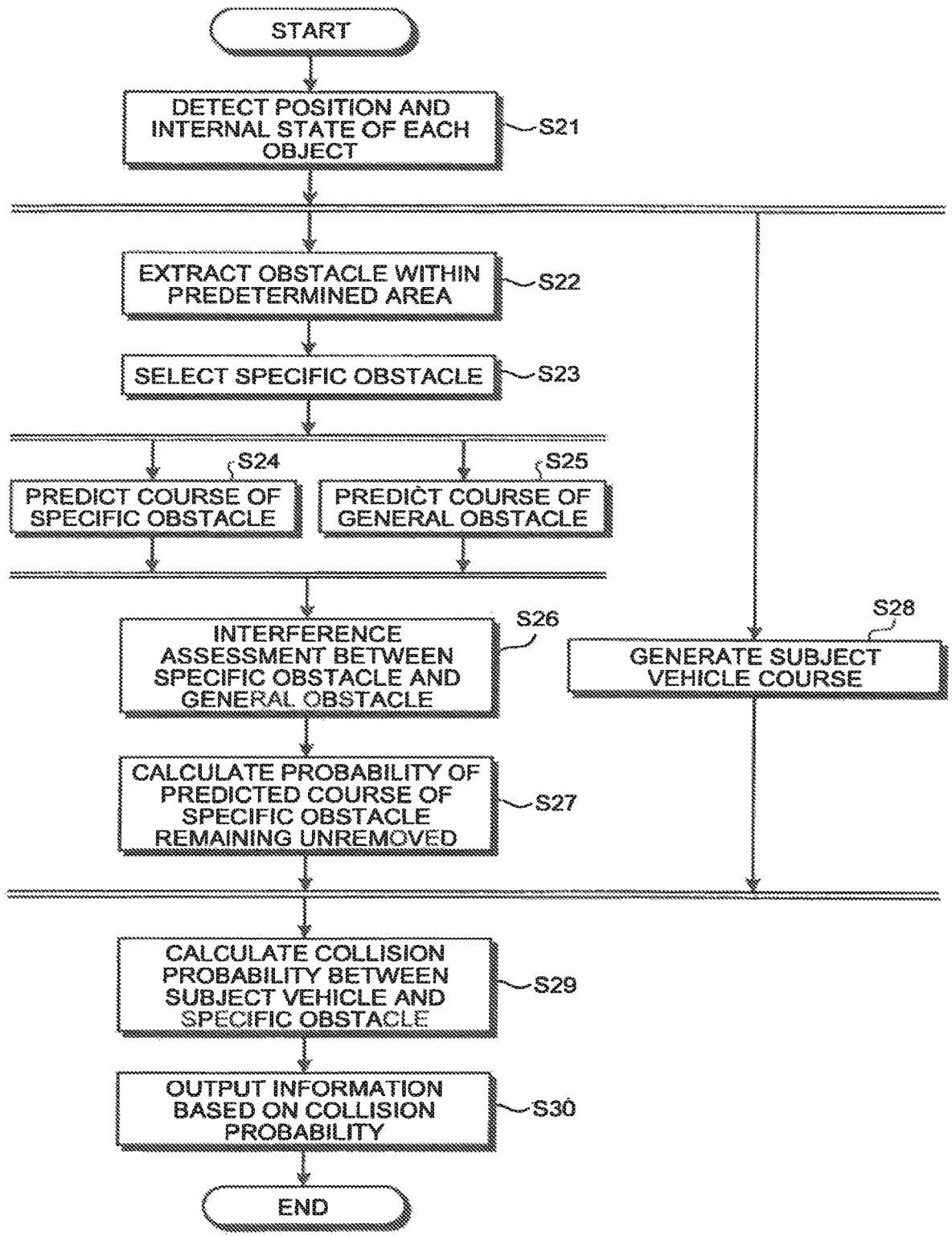
FIG. 20 is a flowchart showing an overview of a process of an obstacle course prediction method according to the fourth embodiment of the present invention.

FIG. 20 is a flowchart showing an overview of the process of the obstacle course prediction method according to the fourth embodiment. First, the position of the object within the predetermined area with respect to the subject vehicle $C_O$ and the internal state thereof and the position and the internal state of the subject vehicle are detected, and the detected information is stored in the memory unit 10 (step S21).

Next, the obstacle extracting unit 3 extracts the obstacle within the predetermined area, based on the result detected by the sensor unit 32 (step S22).

Subsequently, the specific obstacle selecting unit 4 selects one specific obstacle out of the obstacles extracted by the obstacle extracting unit 3 (step S23). In the fourth embodiment, since the sensor unit 32 may also detect the internal state of the subject vehicle $C_0$, the obstacle of which time to collision (TTC), which is the time until the subject vehicle $C_0$ collides with the obstacle when traveling under the present circumstances, is the shortest may be selected as the specific obstacle.

After that, the processes from the step S24 to the step S27 to be performed for the specific obstacle $O_S$ and the general obstacle $O_G$ other than the subject vehicle $C_0$ are the same as the processes from the step S4 to the step S7 described in the above-described first embodiment.

On the other hand, the subject vehicle-course generating unit 38 generates the course of the subject vehicle using the subject vehicle information detected by the sensor unit 2 (step S28). Specifically, the subject vehicle-course generating unit 33 generates the trajectory in a case in which the subject vehicle travels under the present circumstances. Meanwhile, if it is possible that the sensor unit 32 detects a road surface environment such as a white line, the trajectory according to the number of travelable lanes may be generated. The step S28 is performed in parallel with the processes from the step S22 to the step S27.

After that, the collision probability calculating unit 34 calculates the probability that the course of the subject vehicle generated by the subject vehicle-course generating unit 33 and the course of the specific obstacle obtained by the course interference assessing unit 7 collide with each other (step S29). At the step S29, when a distance between the course of the subject vehicle and the course of the specific obstacle becomes smaller than a predetermined distance at the same time, they are considered to collide with each other to calculate the collision probability is calculated. The distance with which they are considered to collide with each other is defined according to the type of the specific obstacle.

The output unit 35 outputs predetermined information based on the collision probability obtained at the step S29 (step S30). For example, this displays with the display unit 352 when the collision probability is larger than the predetermined threshold value, and emits the warning sound from the warning sound emitting unit 35 when the collision probability is larger than the predetermined threshold value. Meanwhile, when the subject vehicle-course generating unit 33 generates a plurality of courses, the course (or lane) of which collision probability is the lowest may be displayed or informed by voice as suggested course (or a suggested lane).

According to the above-described fourth embodiment of the present invention, even about the course, which may be taken with high probability when seen on a separate obstacle basis, if this interferes with another obstacle, the prediction may be performed by taking an effect thereof into consideration, by predicting the course, which the obstacle may take, based on the position and the internal state of the obstacle, and at the time of the prediction, probabilistically predicting a plurality of courses of the specific obstacles selected by a predetermined condition and predicting the course of the general obstacle other than those, and when there are a plurality of obstacles, lowering the predicted probability of the course of which distance at the same time from the course, which the general obstacle may take, is smaller than a predetermined value out of a plurality of courses, which the specific obstacle may take, and calculating the probability that each of a plurality of courses of the specific obstacle including the course of which predicted probability is lowered, is realized. Therefore, it becomes possible to appropriately predict the course of the obstacle even under the complicated traffic environment.

Also, according to the fourth embodiment, it becomes possible to appropriately determine safety of the subject vehicle course under the complicated traffic environment within the practical time period, by calculating the collision probability between the subject vehicle course and the predicted course of the specific obstacle.

Meanwhile, as a modification of the fourth embodiment, it is also possible to further provide an subject vehicle-course generating unit and a collision probability calculating unit to the obstacle course prediction apparatus according to the third embodiment. In this case, the probabilities for the courses of all the obstacles are calculated and the collision probability with the subject vehicle course is calculated.

Fifth Embodiment

A fifth embodiment of the present invention is characterized in generating the course of the subject vehicle in addition to predicting the course of the specific obstacle by using the trajectory generated in the three-dimensional space-time as in the above-described second embodiment, thereby obtaining the collision probability between the specific obstacle and the subject vehicle.

Figure 21:
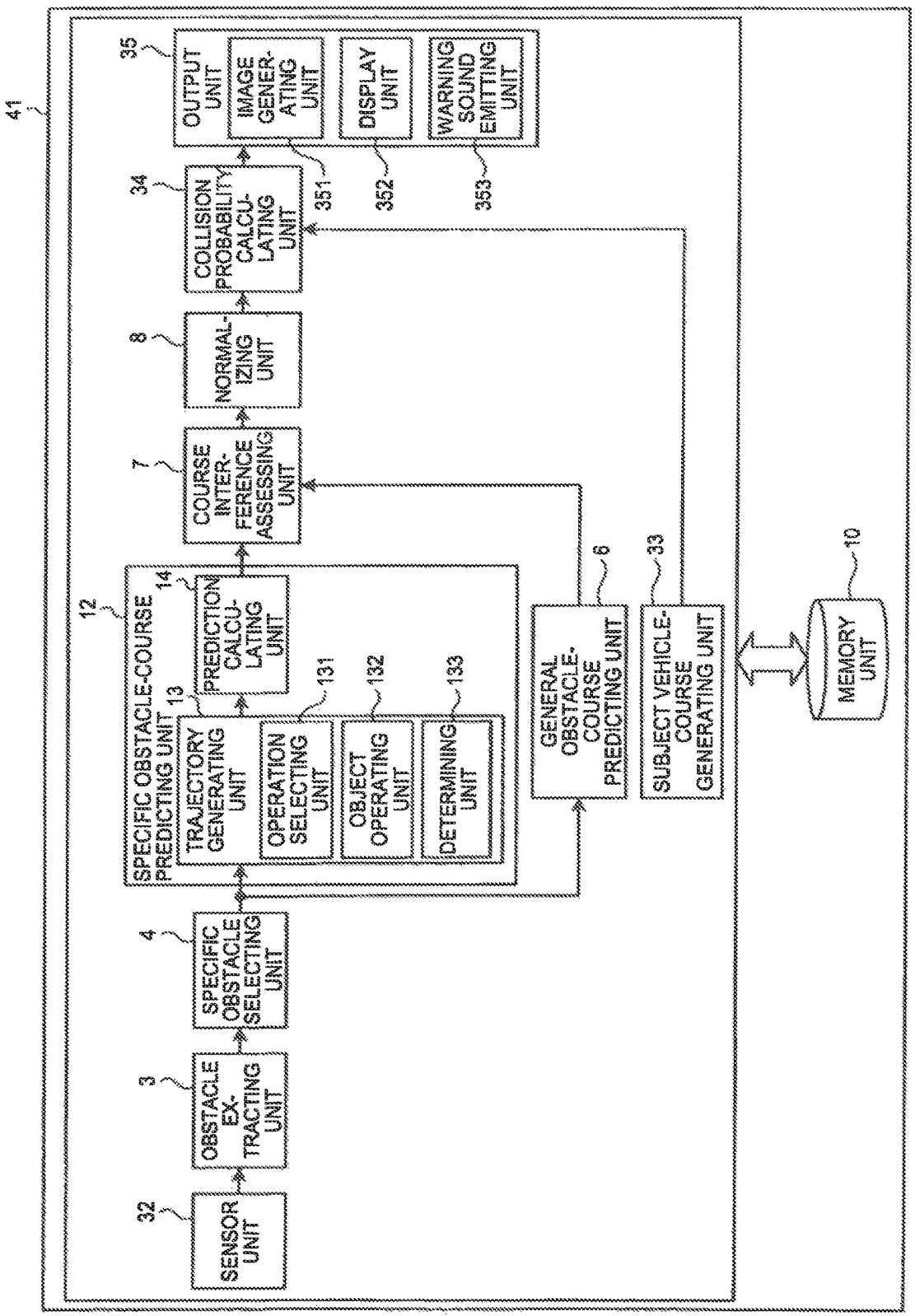
FIG. 21 is a block diagram showing a functional configuration of an obstacle course prediction apparatus according to a fifth embodiment of the present invention.

FIG. 21 is a block diagram showing a functional configuration of an obstacle course prediction apparatus according to the fifth embodiment of the present invention. An obstacle course prediction apparatus 41 shown in this drawing detects the position and the internal state of the object present within the predetermined area, and is provided, with the sensor unit 32 for detecting the position and the internal state of the subject vehicle, the subject vehicle-course generating unit 33 for generating the course of the subject vehicle from the present position, the collision probability calculating unit 34 for calculating the collision probability between the subject vehicle and the specific obstacle, and the output unit 35 for outputting the information regarding the collision probability between the subject vehicle and the specific obstacle calculated by the collision probability calculating unit 34. The output unit 35 has the image generating unit 351 for generating the image based on the collision probability calculated at the collision probability calculating unit 34, the display unit 352 for display outputting the information including the image generated by the image generating unit 351, and the warning sound emitting unit 353 for emitting the warning sound (including voice) when the collision probability between the subject vehicle course generated by the subject vehicle-course generating unit 33 and the specific obstacle is larger than the predetermined threshold value. The configuration of the obstacle course prediction apparatus 41 other than those described herein is the same as the configuration of the obstacle course prediction apparatus 11 according to the above-described second embodiment (refer to FIG. 10).

The obstacle course prediction method according to the fifth embodiment is the same as the obstacle course prediction method according to the above-described fourth embodiment, except for the details of the course prediction process of the specific obstacle and the collision probability calculation process (refer to the flowchart in FIG. 20). Also, the course prediction process of the specific obstacle is the same as the obstacle course prediction method according to the above-described second embodiment (refer to FIGS. 11 and 12). Then, in the following description, the collision probability calculation process (corresponding to the step S29 in FIG. 20) is described in detail. Meanwhile, in the following description, the same step number is used for the same process as the obstacle course prediction method according to the above-described fourth embodiment.

Figure 22:
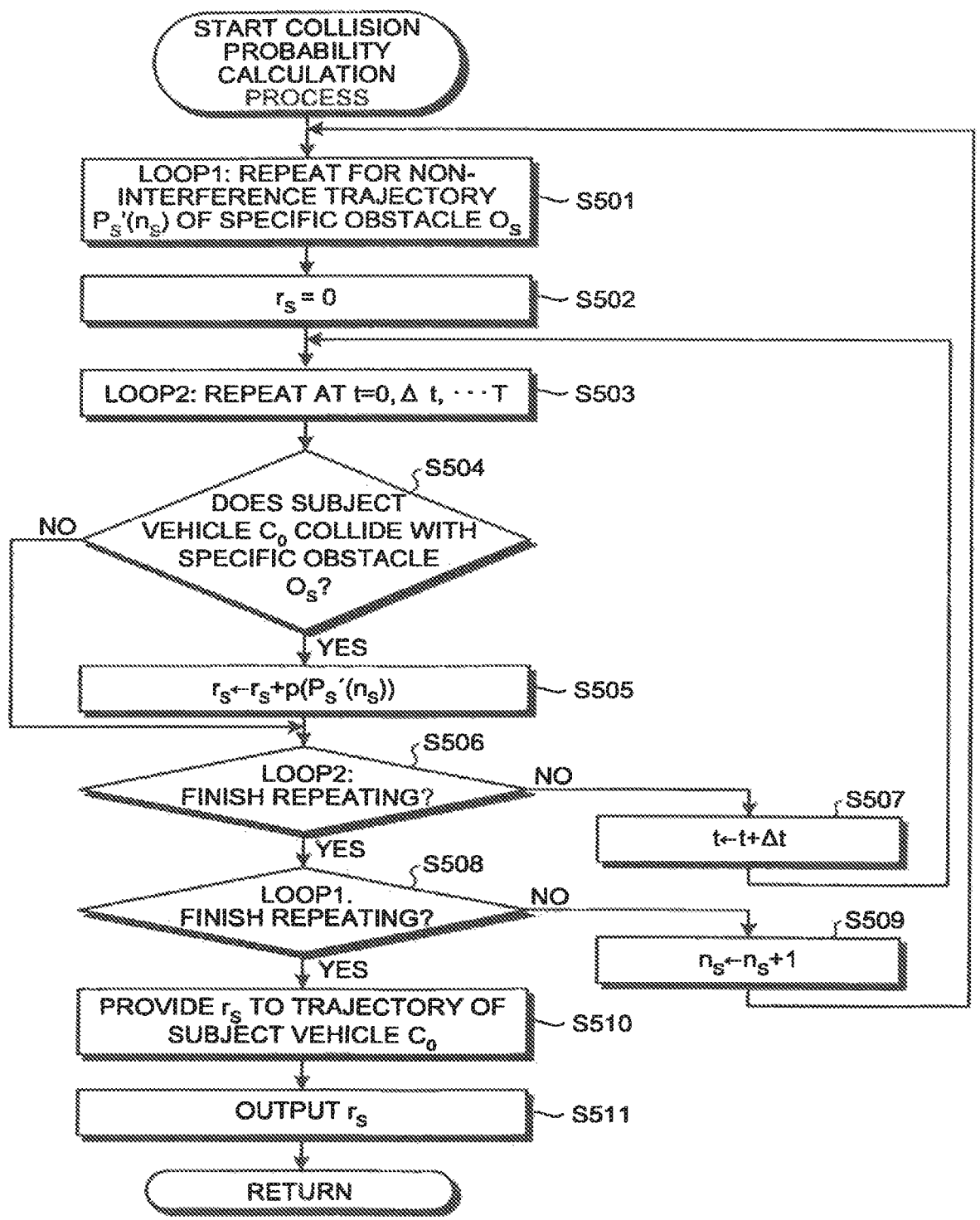
FIG. 22 is a flowchart showing a detail of a collision probability calculation process of an obstacle course prediction method according to the fifth embodiment of the present invention.

FIG. 22 is a flowchart showing a detail of the collision probability calculation process. The collision probability calculation process shown in the drawing is composed of two loop processes and calculates the collision probability between the trajectory $P_0$ of the subject vehicle $C_0$ generated at the step S28 and a non-interference trajectory set $\{P_S' (n)\}$ remaining unremoved at the step S26. At that time, the collision probability calculating unit 34 calculates the collision probability using the trajectory $P_0$ of the subject vehicle $C_0$, the non-interference trajectory set $\{P_S' (n)\}$ of the specific obstacle $O_S$, and an assessment function, which assesses the collision probability between the subject vehicle $C_0$ and the specific obstacle $O_S$. Meanwhile, in the fifth embodiment, although it is described assuming that the collision probability calculating unit 34 incorporates the assessment function, the assessment function may be input from outside by providing an input unit to the obstacle course prediction apparatus 41. Also, the assessment function may be adoptively changed depending on the type of the road and the velocity of the subject vehicle $C_0$.

First, the collision probability calculating unit 34 sequentially performs a repetitive process (Loop1) for all the elements $P_S' (n_S)$ ($n_S$=1, 2, . . . , $N_S$) of the non-interference trajectory set $\{P_S' (n)\}$ for the specific obstacle $O_S$ (step S501). In this repetitive process, an interference degree $r_S$ is introduced as an amount to quantitatively provide a degree of interference between the subject vehicle $C_0$ and the specific obstacle $O_S$, and an initial value of the interference degree $r_S$ is set to 0 (step S502).

Next, the collision probability calculating unit 34 starts the repetitive process (Loop2) to assess the interference between the trajectory $P_0$ of the subject vehicle $C_0$ and one non-interference trajectory $P_S' (n_S)$ at the specific obstacle $O_S$ (step S503). In this Loop2, the distance between the two trajectories $P_0$ and $P_S' (n_S)$ at the same time is sequentially obtained at the time t=0, $\Delta$t, . . . , T. In the fifth embodiment also, when a spatial distance between the two trajectories at the same time becomes smaller than a predetermined value (for example, normal width and length of the vehicle), it is considered that the subject vehicle $C_0$ and the specific obstacle $O_S$ collide with each other, and the maximum value of the distance with which it is considered that the two vehicles collide with each other (spatial distance interfering with each other) is referred to as an interference distance.

Figure 23:
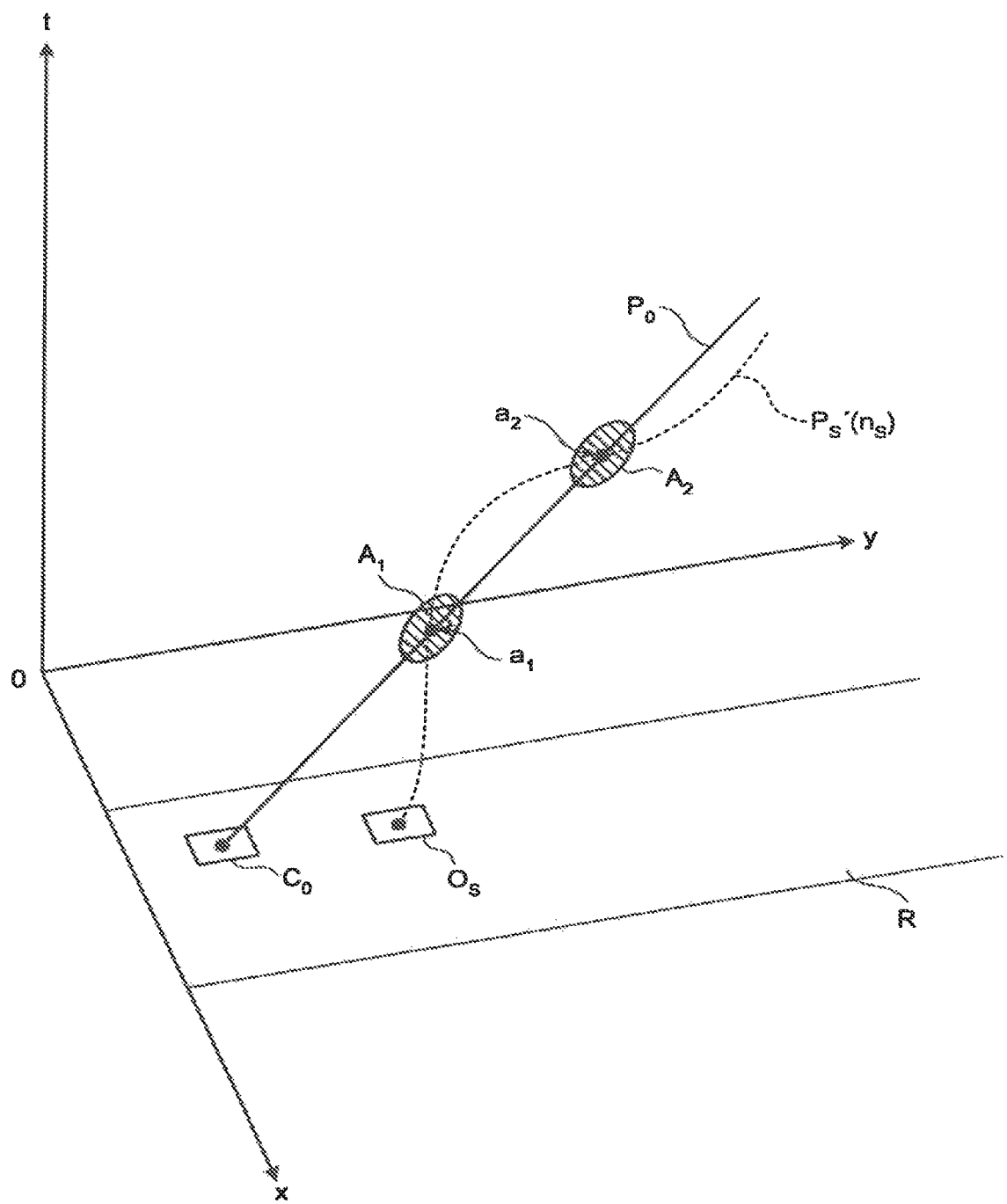
FIG. 23 is a view schematically showing a relationship between the trajectory of the subject vehicle and a non-interference trajectory of the specific obstacle in the three-dimensional space-time.

FIG. 23 is a view schematically showing a relationship in the space-time between the trajectory $P_0$ of the subject vehicle $C_0$ and the non-interference trajectory $P_S'(n_S)$ of the specific obstacle $O_S$. In the shown example, the trajectory $P_0$ and the non-interference trajectory $P_S'(n_S)$ intersect with each other at two points $a_1$ and $a_2$. Therefore, areas $A_1$ and $A_2$ in which a distance between the two trajectories at the same time is smaller than the interference distance are present in the vicinity of the two points $a_1$ and $a_2$, respectively. That is to say, at the time in which the two trajectories $P_0$ and $P_S'(n_S)$ are included in the areas $A_1$ and $A_2$, respectively, it is determined that the subject vehicle $C_0$ and the specific obstacle $O_S$ collide with each other. In other words, the number to pass through the areas $A_1$ and $A_2$ at the time t=0, $\Delta$t, . . . , T is the number of collisions of the subject vehicle $C_0$ with the specific obstacle $O_S$.

As is clear from FIG. 23, in the space-time environment formed in the fifth embodiment, even when the two trajectories collide with each other once the trajectory thereafter is generated. This is because the trajectories of the objects are separately generated.

After that, the collision probability calculating unit 34 obtains the distance between the subject vehicle $C_0$ and the specific obstacle $O_S$ and when this determines that the subject vehicle $C_0$ and the specific obstacle $O_S$ collide with each other in the above-described sense as a result thereof (Yes at the step S504), this defines a value of the interference degree $r_S$ as

[Equation 8]

$$r_S \leftarrow r_S + p(P_S'(n_S)) \quad (8)$$

(step S505). Herein, a second term $p(P_S'(n_S))$ is the probability that the trajectory $P_S'(n_S)$ is selected (herein, the probability distribution function already provided to each trajectory is normalized by the normalizing unit 8). Meanwhile, when the subject vehicle $C_0$ and the specific obstacle $O_S$ do not collide with each other at the step S504, the procedure directly proceeds to a step S506 to be described later.

The collision probability calculating unit 34 does not finish the repetition when the time t does not reach T after the step S505 (No at the step S506), and increments the value of t by $\Delta$t (step S507), and returns to the step S503 to repeat the Loop2. On the other hand, the collision probability calculating unit 34 finishes the Loop2 when the time t reaches T after the step S505 (Yes at the step S506).

By the above-described repetitive process of Loop2, the value of the interference degree $r_S$ becomes larger value as the number of collisions is larger. After the Loop2 is finished, the collision probability calculating unit 34 performs determination process whether to repeat the Loop1 or not. That is to say, when there is the trajectory of which interference assessment with the trajectory $P_0$ of the subject vehicle $C_0$ is not performed out of the trajectories generated for the specific obstacle $O_S$, this does not finish the Loop1 (No at the step S508) and makes $n_S$ to $n_S+1$ (step S509), and returns back to the step S501 to repeat the Loop1.

On the other hand, when the interference assessment with the trajectory $P_0$ of the subject vehicle $C_0$ is performed for all the trajectories $P_S'(n_S)$ generated for the specific obstacle $O_S$ (Yes at the step S508), the collision probability calculating unit 34 provides the final interference degree $r_S$ to assess the interference between the trajectory $P_0$ of the subject vehicle $C_0$ and all the non-interference trajectory set $\{P_S'(n)\}$ of the specific obstacle $O_S$ (step S510), and outputs the provided interference degree $r_S$ to store in the memory unit 10 (step S511).

Herein, when the number of collisions of the trajectory $P_0$ of the subject vehicle $C_0$ and the trajectory $P_S'(n_S)$ of the specific obstacle $O_S$ is set to $M(n_S)$, the value of the interference degree $r_S$ is the sum of the values, which are obtained by multiplying the probability $p(P_S'(n_S))$ for each trajectory $P_S'(n_S)$ by $M(n_S)$, of all the elements of the trajectory set $\{P_S'(n_S)\}$.

[Equation 9]

$$r_S = \sum_{n_S=1}^{N_S} M(n_S)p(P_S'(n_S)) \quad (9)$$

A sum of a right side of the equation (9) is no more than the collision probability that the trajectory $P_0$ of the subject vehicle $C_0$ collide with the trajectory, which the specific obstacle $O_S$ may take. That is to say, the collision probability that the subject vehicle $C_0$ and the specific obstacle $O_S$ collide with each other may be obtained by the equation (9).

After that, the output unit 35 displays information with the display unit 352 and emits the warning sound from the warning sound emitting unit 353 when the interference degree $r_S$, which is the collision probability between the subject vehicle $C_0$ and the specific obstacle $O_S$, is larger than a predetermined threshold value (step S30)

According to the above-described fifth embodiment of the present invention, even about the course, which may be taken with high probability when seen on a separate obstacle basis, if this interferes with another obstacle, the prediction may be performed by taking an effect thereof into consideration, by predicting the course, which the obstacle may take, based on the position and the internal state of the obstacle, and at the time of the prediction, probabilistically predicting a plurality of courses of the specific obstacles selected by a predetermined condition and predicting the course of the general obstacle other than those, and when there are a plurality of obstacles, lowering the predicted probability of the course of which distance from the course, which the general obstacle may take, the same time is smaller than a predetermined value out of a plurality of courses, which the specific obstacle may take, and calculating the probability that each of a plurality of courses of the specific obstacle including the course of which predicted probability is lowered, is realized. Therefore, it is possible to appropriately predict the course of the obstacle even under the complicated traffic environment.

Also, according to the fifth embodiment, the course of the dynamic object may be predicted with high accuracy, generating the variation in position, which the specific obstacle may take with time, as the trajectory in space-time composed of time and space, and probabilistically predicting the course of the specific obstacle by using the generated trajectory.

Further, according to the fifth embodiment, it becomes possible to appropriately determine safety of the subject vehicle course under realistically possible circumstance within the practical time period, by calculating the interference degree quantitatively indicating the degree of interference between the trajectory, which the specific obstacle may take, and the trajectory, which the subject vehicle may take in the space-time, and obtaining the calculated interference degree as the collision probability.

Meanwhile, it is also possible to further provide the subject vehicle-course generating unit and the collision probability calculating unit to the obstacle course prediction apparatus according to the above-described third embodiment, as a modification of the fifth embodiment. In this case, the collision probability between the subject vehicle $C_0$ and all the obstacles in the space-time environment by repeatedly performing the above-described processes from the step S501 to the step S511 for a plurality of obstacles.

Another Embodiment

Although the first to fifth embodiments are described in detail as the best mode for implementing the present invention, the present invention is not limited to the five embodiments. For example, it may be configured such that the predicted probability of the courses, which interfere with each other, is lowered in place of setting the predicted probability of taking the courses interfering with each other to 0 and removing the same.

Also, it is possible to equally treat all the obstacles by using the obstacle course prediction method described in the above-described first and second embodiments. In this case, the specific obstacle selecting unit sequentially selects the obstacle extracted by the obstacle extracting unit based on an optional rule (for example, in an order of distance with the subject vehicle from the closest to the farthest) and repeat performing the course prediction process for each specific obstacle by a loop.

Further, it is possible to apply the present invention to an automated driving system. In this case, it may be configured such that an operation signal to operate the subject vehicle is generated in response to the output of the obstacle course prediction apparatus (the course predicted result and the collision probability with the subject vehicle) and the operation signal is transmitted to a predetermined actuator device provided on the subject vehicle.

Also, it is possible to arrange a virtual obstacle in addition to the real obstacle detected by the sensor unit and predicts the course for the virtual obstacle. More specifically, it is possible to form a virtual model, which behaves undesirably for the subject vehicle, and predicts the course thereof by arranging the model to a predetermined position. By arranging such a virtual model to a position, which is not detected from the subject vehicle traveling near a blind cross point due to presence of a screen or the like, it becomes possible to predict the risk of collision or the like with the obstacle, which may jump from the cross point. Meanwhile, information of the virtual model may be stored in the memory unit in advance and arranged on a desired position according to condition setting from a separately provided input unit.

When applying the obstacle course prediction apparatus according to the present invention to a region such as the express highway at which travel of only vehicles is supposed, it may be configured that traveling circumstances of the vehicles, which travels close to each other, are exchanged by vehicle-to-vehicle communication, by providing communication means for the vehicle-to-vehicle communication to each vehicle. In such a case, it is possible that each vehicle stores the operation history in its memory unit, provides the operation selection probability for each operation based on the operation history, and transmits this with the information regarding the operation selection probability to another vehicle. Thereby, the accuracy of the course prediction becomes high, and the risk while traveling may be further surely avoided.

In addition, it is possible to use the global positioning system (GPS) as position detecting means. In this case, the positional information and the move information of the object detected by the sensor unit may be corrected by referring to the three-dimensional map information stored in the GPS. Further, it is also possible to alternatively communicate the output of the GPS to allow to operate as the sensor unit. In any case, it is possible to realize the course prediction with high accuracy by using the GPS, and the reliability of the predicted result may further be improved.

Meanwhile, the obstacle course prediction apparatus according to the present invention may be mounted on the mobile object such as the vehicle other than the four-wheeled vehicle, the person, and a robot.

Also, the obstacle course prediction apparatus according to the present invention is not necessarily mounted on the mobile object. For example, if the subject vehicle may utilize the vehicle-to-vehicle communication and road-to-vehicle communication, the obstacle course prediction apparatus according to the present invention may be formed of the course interference assessing system including the subject vehicle, another vehicle around the subject vehicle, and infrastructure. In this case, it is also possible to perform the course prediction calculation of the obstacle on an infrastructure side, and to specify the subject vehicle as the prediction calculation requesting vehicle, which requires the infrastructure side the prediction calculation result and receives the same, and performs the process base on the received prediction calculation result.

As is clear from the above description, the present invention may include various embodiments not described herein, and various design changes may be made within the scope of the technical idea specified by the claims.

INDUSTRIAL APPLICABILITY

As described above, the obstacle course prediction method, the apparatus, and the program according to the present invention is preferable as the technique to avoid the risk when driving the mobile object such as the four-wheel vehicle and assuring the safety.

The invention claimed is:

1. An obstacle course prediction method for predicting a course of a plurality of obstacles by a computer, the computer having a memory storing at least a position and an internal state of the plurality of obstacles, the method comprising:
   performing prediction of a course for one obstacle based on the position and the internal state of the one obstacle stored in the memory;
   performing probabilistic prediction of a plurality of courses, which the one obstacle may take, at the time of the prediction;
   obtaining a course in which the plurality of obstacles interfere with each other within the plurality of courses, which the plurality of the obstacles is predicted to take;
   when the plurality of obstacles are present within a predetermined area from a mobile object, lowering the predicted probability of the course for which the probabilistic prediction is performed within the interfering courses; and
   calculating a probability of realizing each of the plurality of courses including the course in which the predicted probability is lowered.

2. The obstacle course prediction method according to claim 1, further comprising:
  selecting one of the obstacles satisfying a predetermined condition as a specific obstacle,
  performing probabilistic prediction of a plurality of courses, which the specific obstacle may take, and performing prediction of the course, which the obstacle other than the specific obstacle may take, and
  lowering a predicted probability of a course having a distance at the same time from a course, which the general obstacle may take, that is smaller than a predetermined value, within a plurality of courses, which the specific obstacle may take, and
  the probability calculating calculates probability of realizing each of a plurality of courses of the specific obstacle including the course the predicted probability of which is lowered at the course interference assessing.

3. The obstacle course prediction method according to claim 2, further comprising:
  generating a variation in a position, which the specific obstacle may take with time, as a trajectory in space-time composed of time and space, based on the position and the internal state of the obstacle, and
  performing probabilistic prediction calculation of a course, which the specific obstacle may take, based on the generated trajectory.

4. The obstacle course prediction method according to claim 2, wherein the course of the general obstacle is predicted based on the internal state of the general obstacle being maintained.

5. The obstacle course prediction method according to claim 2, further comprising:
  generating a course of the mobile object based on a position and an internal state of the mobile object; and
  calculating collision probability between the course of the mobile object generated at the course generating and each of a plurality of courses, which the specific obstacle may take, of which probability is calculated for each course.

6. The obstacle course prediction method according to claim 1, further comprising:
  performing probabilistic prediction of a plurality of courses, which the obstacle may take, the course interference assessing lowers probability of taking the course of which distance at the same time from the course of another of the obstacles is smaller than a predetermined value within the courses, which a plurality of the obstacles may take, when there are a plurality of the obstacles, and
  calculating the probability of realizing each of all the courses of a plurality of the obstacles including the course the predicted probability of which is lowered.

7. The obstacle course prediction method according to claim 6, further comprising:
  generating a variation in a position, which the obstacle may take with time, as a trajectory in a space-time composed of time and space, based on the position and the internal state of the obstacle, and
  performing probabilistic prediction calculation of the course of the obstacle based on the generated trajectory.

8. The obstacle course prediction method according to claim 6, further comprising:
  generating a course of the mobile object based on the position and the internal state of the mobile object; and
  calculating collision probability between the course of the mobile object generated at the course generating and each of all courses, which the obstacle may take, of which the probability is calculated for each course.

9. An obstacle course prediction apparatus for a course of a plurality of obstacles existing around a mobile object, the obstacle course prediction apparatus comprising:
  a memory that memorizes at least a position and an internal state of a plurality of obstacles present within a predetermined area around the mobile object; and
  a processor programmed to function as:
    a course predicting unit that performs prediction of a course for one obstacle based on the position and the internal state of the one obstacle stored in the memory, and performs probabilistic prediction of a plurality of courses that the one obstacle may take at the time of the prediction;
    a course interference assessing unit that: (i) obtains a course in which the plurality of obstacles interfere with each other within the plurality of courses, which the plurality of the obstacles predicted at the course predicting unit take, and (ii) lowers a predicted probability of the course for which the probabilistic prediction is performed within the interfering courses; when the plurality of obstacles are present within the predetermined area from the mobile object; and
    a probability calculating unit that calculates a probability of realizing each of the plurality of courses including the course in which the predicted probability is lowered in the course interference assessing unit.

10. The obstacle course prediction apparatus according to claim 9, wherein
  the processor is further programmed to function as:
    a specific obstacle selecting unit that selects one of the obstacles satisfying a predetermined condition as a specific obstacle, and
  the course predicting unit has a specific obstacle course predicting unit that performs probabilistic prediction of a plurality of courses, which the specific obstacle may take, and a general obstacle course predicting unit that performs prediction of the course, which the obstacle other than the specific obstacle may take,
  the course interference assessing unit lowers predicted probability of a course of which distance at the same time from a course, which the general obstacle may take, is smaller than a predetermined value, within a plurality of courses, which the specific obstacle may take, when there are a plurality of the obstacles, and
  the probability calculating unit calculates probability of realizing each of a plurality of courses of the specific obstacle including the course the predicted probability of which is lowered at the course interference assessing unit.

11. The obstacle course prediction apparatus according to claim 10, wherein
  the specific obstacle course predicting unit includes
    a trajectory generating unit that generates variation in position, which the specific obstacle may take with time, as a trajectory in space-time composed of time and space, based on the position and the internal state of the obstacle, and
    a prediction calculating unit that performs probabilistic prediction calculation of a course, which the specific obstacle may take, using the trajectory generated at the trajectory generating unit.

12. The obstacle course prediction apparatus according to claim 10, wherein the general obstacle course predicting unit predicts the course of the general obstacle assuming that the internal state of the general obstacle is maintained.

13. The obstacle course prediction apparatus according to claim 10, wherein the processor is further programmed to function as:

a course generating unit that generates a course of the mobile object based on a position and an internal state of the mobile object; and a collision probability calculating unit that calculates collision probability between the course of the mobile object generated at the course generating unit and each of a plurality of courses, which the specific obstacle may take, of which probability is calculated for each course at the probability calculating unit.

14. The obstacle course prediction apparatus according to claim 9, wherein the course predicting unit performs probabilistic prediction of a plurality of courses, which the obstacle may take, the course interference assessing unit lowers probability of taking the course of which distance at the same time from the course of another of the obstacles is smaller than a predetermined value within the courses, which a plurality of the obstacles may take, when there are a plurality of the obstacles, and the probability calculating unit calculates the probability of realizing each of all the courses of a plurality of the obstacles including the course the predicted probability of which is lowered at the course interference assessing unit.

15. The obstacle course prediction apparatus according to claim 14, wherein the course prediction unit includes a trajectory generating unit that generates variation in position, which the obstacle may take with time, as a trajectory in a space-time composed of time and space, based on the position and the internal state of the obstacle, and a prediction calculating unit that performs probabilistic prediction calculation of the course of the obstacle by using the trajectory generated at the trajectory generating unit.

16. The obstacle course prediction apparatus according to claim 14, wherein the processor is further programmed to function as:

a course generating unit that generates a course of the mobile object based on the position and the internal state of the mobile object; and a collision probability calculating unit that calculates collision probability between the course of the mobile object generated at the course generating unit and each of all courses, which the obstacle may take, of which the probability is calculated for each course at the probability calculating unit.

17. A non-transitory computer readable medium storing an obstacle course prediction program that causes a computer to execute the obstacle course prediction method according to claim 1.

* * * * *